(12) United States Patent
Slaughter et al.

(10) Patent No.: US 9,316,753 B2
(45) Date of Patent: Apr. 19, 2016

(54) NEUTRON SPECTROMETER

(71) Applicant: MERRILL CORPORATION, Clearfield, UT (US)

(72) Inventors: David M. Slaughter, Salt Lake City, UT (US); Reinhard M. Klaass, Provo, UT (US)

(73) Assignee: MERRILL CORPORATION, Clearfield, UT (US)

( * ) Notice: Subject to any disclaimer, the term of this patent is extended or adjusted under 35 U.S.C. 154(b) by 234 days.

(21) Appl. No.: 13/665,027

(22) Filed: Oct. 31, 2012

(65) Prior Publication Data

US 2014/0151567 A1    Jun. 5, 2014

Related U.S. Application Data

(60) Provisional application No. 61/628,474, filed on Nov. 1, 2011.

(51) Int. Cl.
  G01T 1/20    (2006.01)
  G01T 3/00    (2006.01)
  G01T 3/06    (2006.01)

(52) U.S. Cl.
  CPC ............... *G01T 3/001* (2013.01); *G01T 3/065* (2013.01)

(58) Field of Classification Search
  CPC ............... G01T 3/06; G01T 3/00; G01T 1/20
  USPC .................................................. 250/367, 369
  See application file for complete search history.

(56) References Cited

U.S. PATENT DOCUMENTS

| | | |
|---|---|---|
| 3,157,789 A | 11/1964 | Thomas |
| 5,008,067 A | 4/1991 | Czirr |
| 5,231,290 A | 7/1993 | Czirr |
| 5,313,504 A | 5/1994 | Czirr |
| 5,347,129 A | 9/1994 | Miller et al. |
| 5,734,166 A | 3/1998 | Czirr |
| 5,884,234 A | 3/1999 | Jorion et al. |
| 6,953,937 B2 | 10/2005 | Reber et al. |
| 7,342,231 B2 | 3/2008 | Warburton et al. |

(Continued)

FOREIGN PATENT DOCUMENTS

WO    WO 2011/081892 A2    7/2011

OTHER PUBLICATIONS

"Detection Properties of a Neutron Counter Based Scintillator, Wavelength Shifter, and Photomultiplier" IEEE Transactions on Nuclear Science, vol. 50, No. 4, Aug. 2003, pp. 758-761 to Engels et al.*

(Continued)

*Primary Examiner* — Mark R Gaworecki
*Assistant Examiner* — Kenneth J Malkowski
(74) *Attorney, Agent, or Firm* — Foley & Lardner LLP

(57) ABSTRACT

A neutron spectrometer that is more accurate, faster, and more-portable than conventional spectrometers includes an organic scintillator responsive to neutrons and gammas and an inorganic scintillator that captures neutrons. A processor receives signals representative of scintillations in the organic scintillator and in the inorganic scintillator and discriminates neutron signals from gamma signals. The processor also determines pulse areas for neutron moderating signals and performs unfolding based on the determined pulse areas to produce a neutron energy spectrum and/or dose information.

25 Claims, 25 Drawing Sheets

(56) References Cited

U.S. PATENT DOCUMENTS

2005/0269515 A1    12/2005  Saleh et al.
2011/0204244 A1     8/2011  Haard et al.

OTHER PUBLICATIONS

Williams, A.M. et al., "Response of a Lithium Gadolinium Borate Scintillator in Monoenergetic Neutron Fields", *Radiation Protection Dosimetry*, (2004), pp. 497-502.

Czirr, J. et al., "Capture-gated neutron spectrometry", *Nuclear Instruments & Methods in Physics Research*, Section A: 476, (2002), pp. 309-312.

Lewis, D.V., et al., "Lithium-Gadolinium-Borate as a Neutron Dosemeter", *Radiation Protection Dosimetry*, vol. 126, No. 1-4, (2007), pp. 390-393.

"BC-490 Plastic Scintillator Casting Resin", *Saint-Gobain Crystals*, http://www.detectors.saint-gobain.com , (2005), pp. 1-2.

Flaska, M. et al., "Measurements of Continuous-In-Energy Neutron Sources Using the BC-523A Capture-Gated Liquid Scintillator", *IEEE Nuclear Science Symposium Conference Record*, (2009), pp. 940-943.

Flaska, M. et al., "Use of an LGB Detector in Nuclear Nonproliferation Application", *IEEE Nuclear Science Symposium Conference Record*, (2008), pp. 3376-3380.

Pancin, J. et al., "Measurement of the n_TOF beam profile with a micromegas detector", *Nuclear Instruments & Methods in Physics Research*, Section A 524 (2004), pp. 102-114.

Bamford, G.J. et al., "Neutron, Proton and Gamma-Ray Event Identification with a HPGe Detector Through Pulse Shape Analysis", *IEEE Transactions on Nuclear Science*, vol. 38, No. 2, (1991), pp. 200-208.

Simmer, G. et al., "Iterative unfolding for Bonner sphere spectrometers using the MSANDB code—Sensitivity analysis and dose calculation", *Elsevier Radiation Measurement*, vol. 45, (2010), pp. 1-9.

Hansen, R.R. et al., "Neutron-Gamma Discrimination in Plastic Scintillators", *IEEE*, (1999) pp. 1031-1035.

Knoll, G.F., "Radiation Detection and Measurement, Second Edition", *The University of Michigan*, (1989) pp. 672-674.

* cited by examiner

NOTE:

⊘, Gd; ○, O; ⊗, B; and ○, Li.

Fig. 16

| | 0.1 | 0.802941 | 1.656852 | 3.341795 | 17.60315 | 18.32012 | 18.84073 | 19.64742 | 20.48493 | 21.78137 | 23.34583 | 24.82197 | 28.03481 | 34.48884 | 79.53868 | 90.45409 | 110 |
|---|---|---|---|---|---|---|---|---|---|---|---|---|---|---|---|---|---|
| 0.5 | | | | | 0.016519 | 0 | | | | | | | | | | | |
| 1.388228 | 0.098221 | 0.645719 | 0.236393 | 0.497299 | 0.32416 | 0.000007 | | | | | | | | | | | |
| 2.113018 | 0.01238 | 0.165558 | 0.116629 | 0.183564 | 0.682047 | 0.000069 | 0 | | | | | | | | | | |
| 2.922144 | 0.016556 | 0.156444 | 0.146756 | 0.672648 | 0.000682 | 0.000341 | 0 | 0 | | | | | | | | | |
| 3.57941 | 0.021355 | 0.174224 | 0.177674 | 0.606087 | 0.005052 | 0.003327 | 0.002464 | 0.004066 | 0 | | | | | | | | |
| 4.220198 | 0.020207 | 0.155739 | 0.19045 | 0.555188 | 0.01506 | 0.009734 | 0.008815 | 0.013039 | 0.002464 | 0.001232 | 0.000493 | | | | | | |
| 4.962804 | 0.019835 | 0.220432 | 0.21302 | 0.3864 | 0.022881 | 0.014824 | 0.023203 | 0.017403 | 0.013039 | 0.008632 | 0.004408 | 0.004224 | 0 | | | | |
| 6.154127 | 0.023848 | 0.231409 | 0.251957 | 0.32045 | 0.009295 | 0.001957 | 0.01272 | 0.013699 | 0.018591 | 0.020625 | 0.011602 | 0.012568 | 0.005801 | 0.002256 | 0 | | |
| 7.062612 | 0.026419 | 0.149254 | 0.206659 | 0.337543 | 0.008037 | 0.005741 | 0.009185 | 0.010333 | 0.017222 | 0.022505 | 0.027397 | 0.032779 | 0.024951 | 0.004892 | 0 | | |
| 8.42088 | 0.013777 | 0.246753 | 0.155844 | 0.025974 | 0.025974 | 0 | 0 | 0 | 0.019518 | 0.034443 | 0.072331 | 0.082664 | 0.027555 | 0.001148 | 0.004592 | | |
| 13 | 0.038961 | | | | | | | | | 0 | 0 | 0.064935 | 0.220779 | 0.090909 | 0.064935 | 0.064935 | |

NEUTRON SPECTROMETER

CROSS-REFERENCE TO RELATED PATENT APPLICATIONS

This application claims priority to provisional application 61/628,474, filed Nov. 1, 2011, whose entire contents are incorporated herein by reference for the devices, materials, techniques, processing methods, software and other details related to neutron spectrometry.

BACKGROUND OF THE INVENTION

The present invention relates generally to the field of neutron spectrometers. There are many applications where accurate measurement of neutron energy is needed; for example, to calculate the exposure of personnel or determine the integrity of radiation shielding or radiation containment. Unfortunately, current spectrometers (such as Bonner Balls) have large uncertainties, have long signal acquisition and processing times, and other disadvantages.

SUMMARY OF THE INVENTION

This specification describes the development, design, operation, and testing of a novel neutron spectrometer/dosimeter that is compact, efficient, fast, and accurate. Testing at the Los Alamos Neutron Science Center (LANSCE) and the Edwards Accelerator Laboratory (EAL) at Ohio University has demonstrated that the invention can produce neutron spectra over the range between 0.8 MeV and 150 MeV with an uncertainty of only +/−8%.

This spectrometer is the end result of a development program that took 12 years, and uses some of the devices, materials, and techniques described in U.S. Pat. No. 5,231,290, issued in 1993 and U.S. Pat. No. 5,734,166, issued in 1998. The entire contents of both of these patents are incorporated herein by reference for the components, techniques, processes, and materials related to neutron spectrometry described therein.

In one embodiment of the present invention, a 1.3 liter detector head is a heterogeneous composite detector with a hydrogenous plastic scintillator matrix containing uniformly distributed lithium gadolinium borate (LGB) microcrystals. Other materials can be used instead of or in addition to LGB such as lithium yttrium borate. The physics of the composite detector is quite complex and extensive research and development was required to identify and properly characterize all the signals that result from neutron and gamma interactions with the detector.

The plastic scintillator acts to slow impinging neutrons and emits light related to the energy loss as the neutrons moderate in the detector body. Moderating neutrons that have slowed sufficiently capture in one of the Lithium, Boron, or Gadolinium atoms in the LGB, which then releases the capture energy in a characteristic cerium emission pulse. The light pulse resulting from the neutron moderating in the plastic scintillator is then paired with the LGB capture pulse to identify that the moderating pulse was created by a neutron, and is not a pulse created by a gamma (a gamma can create a pulse similar to a neutron moderating pulse).

Five years of development and testing were required to demonstrate that the characteristics of the moderating pulse varied predictably with neutron energy. A test version of the spectrometer was modified to permit it to record the capture of neutrons at facilities with time-of-flight (TOF) capabilities. The inventors were able to identify the energy of each neutron through these time-of-flight techniques and correlate the energy from the TOF measurements with the pulse characteristics.

The inventors discovered that about 2% of the impinging neutrons lose all of their energy in a single collision with the detector. There is a linear relationship between the pulse areas of this group of neutrons and energy. However, the other 98% of neutrons have a wide range of collision histories within the detector body. When these neutrons are "binned" into energy groups, each energy group contains a distribution of pulse areas. This data was used as the basis for developing an unfolding algorithm for the spectra. The unfolded spectra were then validated at various facilities and matched against known spectra, both for common neutron emitting isotopes and against the facility spectra of the various institutions that provided a source of neutrons for this program. Having validated the spectra, the dose equivalent and dose rate can be determined by applying standard, regulatory damage coefficients to the measured neutron counts for each energy bin of the spectra.

This efficient self-contained neutron spectrometer/dosimeter will have wide application in health physics, land-based and sea-based nuclear power plants, scientific research, and programs to monitor and control nuclear materials and weapons.

BRIEF DESCRIPTION OF THE DRAWINGS

FIG. 16 illustrates a typical calibrated response matrix (CRM) which comprises neutron energy rows and moderating pulse area columns.

DETAILED DESCRIPTION OF CERTAIN EMBODIMENTS

The following describes the design and testing of neutron spectrometer/dosimeters according to various embodiments of the invention. A brief description of the LGB scintillator is presented, followed by a discussion of the physics of a composite detector for this system and then a detailed description of the signal processing algorithms and calibration/validation is set forth.

Overall Instrument Description

Figure 1:
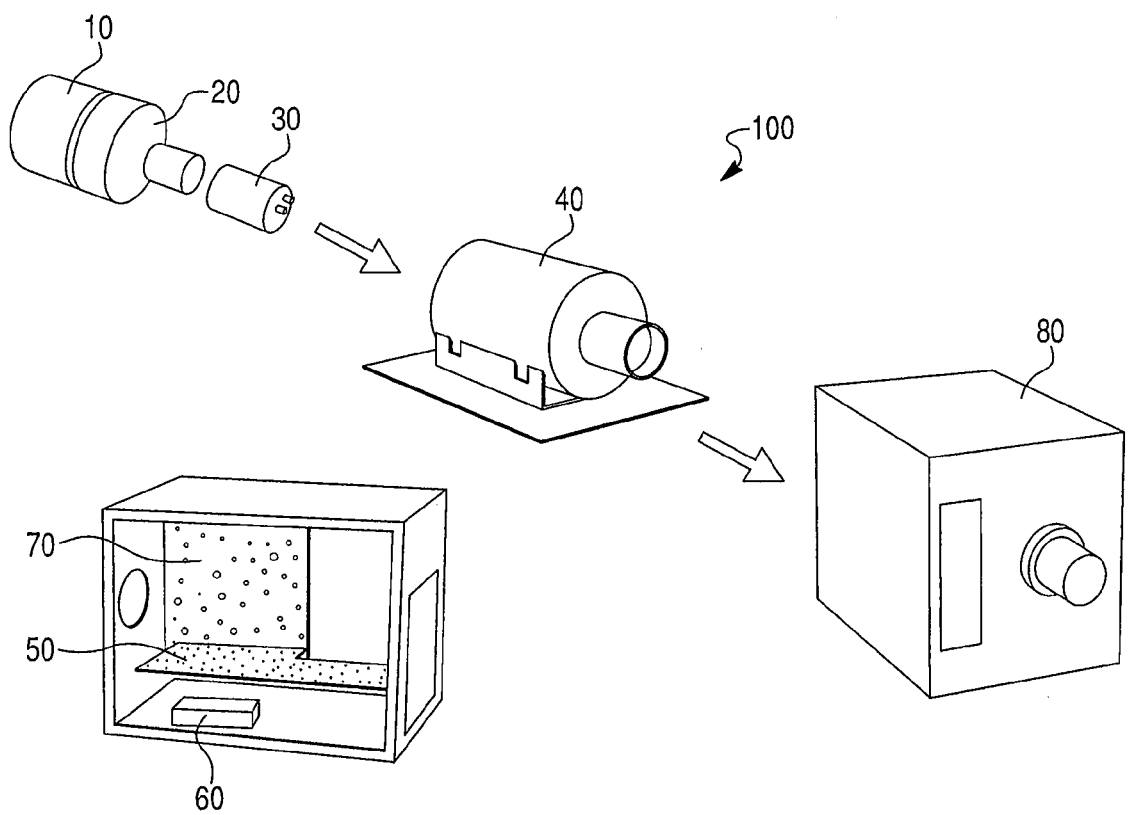
FIG. 1 illustrates a neutron spectrometer of one embodiment of the invention.

FIG. 1 shows one embodiment of a neutron spectrometer 100, according to one embodiment of the invention. The spectrometer 100 includes a detector head 10, a photomultiplier tube (PMT) 20, and a voltage divider 30 in a detector assembly light-tight enclosure 40. The enclosure 40, along with a digitizer 50, high-voltage power supply 60, and computer motherboard 70, together form a neutron spectrometer assembly 80.

The instrument shown in FIG. 1 and described in further detail below combines a number of technologies into an efficient neutron spectrometer/dosimeter, including 1. $^{6}Li_{6}^{nat}Gd^{10}B_{3}O_{9}$:Ce (LGB) scintillator crystals,
2. a composite detector composed of the LGB scintillator crystals uniformly distributed in a poly-vinyl toluene (PVT) scintillator, and
3. pulse shape discrimination (PSD) algorithms/software that analyze the complex signals produced by the LGB scintillator crystals (which contain three neutron capturing nuclei) and the PVT scintillator.

The instrument also incorporates several commercial off-the-shelf (COTS) components, including the photomultiplier tube (PMT) 20, wave form digitizer, mini-computer with accessories, high-voltage power supply 60 and voltage divider 30. A description of each of the components follows.

LGB Detector Head

Figure 2:
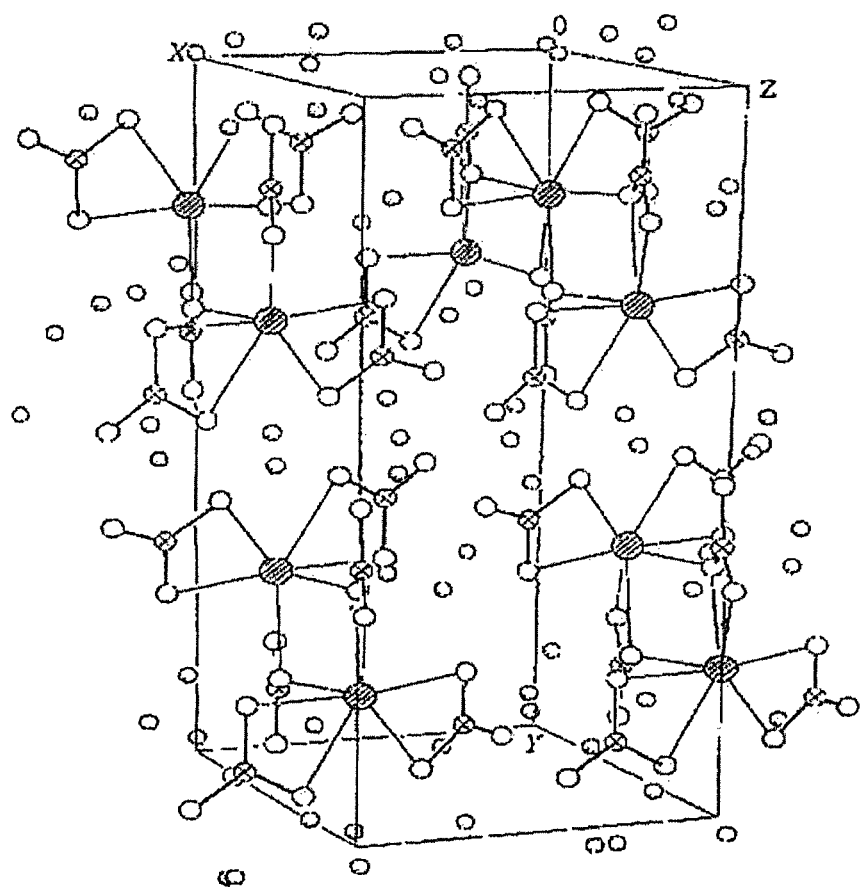
FIG. 2 illustrates the structure of a unit cell of $^6Li_6{}^{nat}Gd^{10}B_3O_9$:Ce with covalent bonds indicated by bold lines and ionic bonds by thin lines, and bonds formed by Li atoms not shown.

The detector head 10 incorporates an LGB/PVT scintillator. The crystalline structure of LGB consists of oxygen polyhedra of rare-earth and alkali ions connected by isolated boron-oxygen triangles in a three dimensional mixed framework. A unit cell for a single crystal $^{6}Li_{6}^{nat}Gd^{10}B_{3}O_{9}$:Ce, shown in FIG. 2, is made up of both covalent bonds (bold lines) and ionic bonds (thin lines). Further details of this structure is set forth in Dolzhenkova, E. F., V. N. Baumer, S. I. Gordeev, "Fracture Toughness and Crystallographic Characteristics of $^{6}Li_{6}^{nat}Gd^{10}B_{3}O_{9}$ Single Crystals," Crystallography Reports, Vol. 48, No. 4, pp. 563-567, whose entire contents are incorporated herein by reference for such details.

Models of LGB scintillators have shown that the crystal structure and bonding assists in the transfer of energy resulting from neutron capture in the Li, B, or Gd. It is the cerium, in the correct concentration and in its +3 oxidative state, which absorbs the energy of the emitted alpha produced by the neutron capture in Li and B, and translates it into visible light at 370-470 nm. The gammas emitted from neutron capture by the Gd also interact with the LGB crystal structure, depositing energy for light that is also subsequently emitted by the Ce. The gamma rays that escape the LGB scintillator crystals can further interact with the PVT by electron recoil to create additional scintillations. To a lesser extent, gammas will interact with Gd directly resulting in scintillation at 315 nm.

The LGB crystals operate as a transparent scintillator where the neutron absorption efficiency increases with increasing thickness. The refractive index is 1.65, allowing the crystals to be incorporated into plastics with similar refractive indices. The detector head 10 is composed of 0.7-1.5 mm LGB crystal shards uniformly dispersed in a commercially available scintillating plastic, poly-vinyl toluene or PVT (EJ-290 made by Eljen Technologies/Ludlum Measurements Inc.). The refractive index of the PVT is 1.58. The 5" (12.7 cm) diameter by 4" (10.16 cm) long detector head incorporates 10% LGB by weight (3% by volume).

Photomultiplier Tube

The PMT 20 is a B133D01 made by ADIT/Ludlum and receives light from the detector head 10 and converts the light into electrical signals. It is a 5" (12.7 cm) diameter, 10 stage, end-on photomultiplier with extended sensitivity in the blue wavelength region. The peak sensitivity above 70 ma/Watt ranges from 380 to 470 nm with a quantum efficiency above 20%. The typical high voltage input is 1100 VDC with a recommended maximum operating voltage of 1500 VDC. One embodiment of the invention operates in the 1250-1450 VDC range. The current produced by incident light is amplified by a factor of one million to one, at 1100 VDC.

Digitizer

The digitizer 50 receives the electrical signals from PMT 20 via voltage divider 30 and is a model Razor CompuScope 1422 multi-channel digitizer made by Gage Applied Technologies (Lachine, Quebec). This waveform digitizer operates at 14 bit and a sampling rate of 200 Mega-Samples/second (MS/s). At 200 MS/s, the time between samples is 5 ns with a peripheral component interconnect (PCI) 32 Bit bus interface. In this embodiment, the digitizer is not capable of performing real-time acquisition, due to the size of on-board memory and the low data transfer rate to a computer hard drive memory, however real-time acquisition may be used with larger memory and higher rates and is within the scope of the invention. Segment width for every trigger is 592 µs with non-consecutive data segments acquired and saved to binary signal files.

Mini-Computer and Accessories

The computer motherboard 70 receives data from the digitizer 50 and is a Jetway model NC9C-550 mini-ITX board mounted in a Lian model Li Mini-Q PC-Q08 Mini ITX chassis. The motherboard is an expandable platform with a 1.5 GHz Intel Atom fan-less processor, dual core N550, paired with a NM10 controller hub. It features a dual Gb LAN, VGA, PCI, PCIe Mini Card slot for wireless capability, GPIO, LVDS, and support for 4 USB 2.0 ports. It uses 11 watts of power and has up to 2 GB of memory.

A 150 GB HDD hard drive from Western Digital, model WD1500BLFS, is connected to the motherboard to manage all operations using Microsoft Windows 7 and software described below.

In addition, a 10.2" (25.9 cm) LCD monitor with VGA and AV inputs is available for operating a stand-alone instrument at remote sites. The monitor is a Xenarc, model 1020YV unit and is connected to the mini-computer VGA and USB connections.

High-Voltage Power Supply/Voltage Divider

The high-voltage power supply (HVPS) 60 is used to supply high direct current voltage to the PMT 20 and is connected to the voltage divider 30. The power supply is a model 2A12-P4 made by Ultravolt in Ronkonkoma, N.Y. The voltage divider 30 is a model 2007 made by Canberra Industries Inc. in Meriden, Conn. A 50 ohm terminator is connected to the dynode output and the detector output pulse signal is connected from the anode of the voltage divider 30 into channel 1 of the digitizer 50.

Detector Head Response to Radiation

Figure 3:
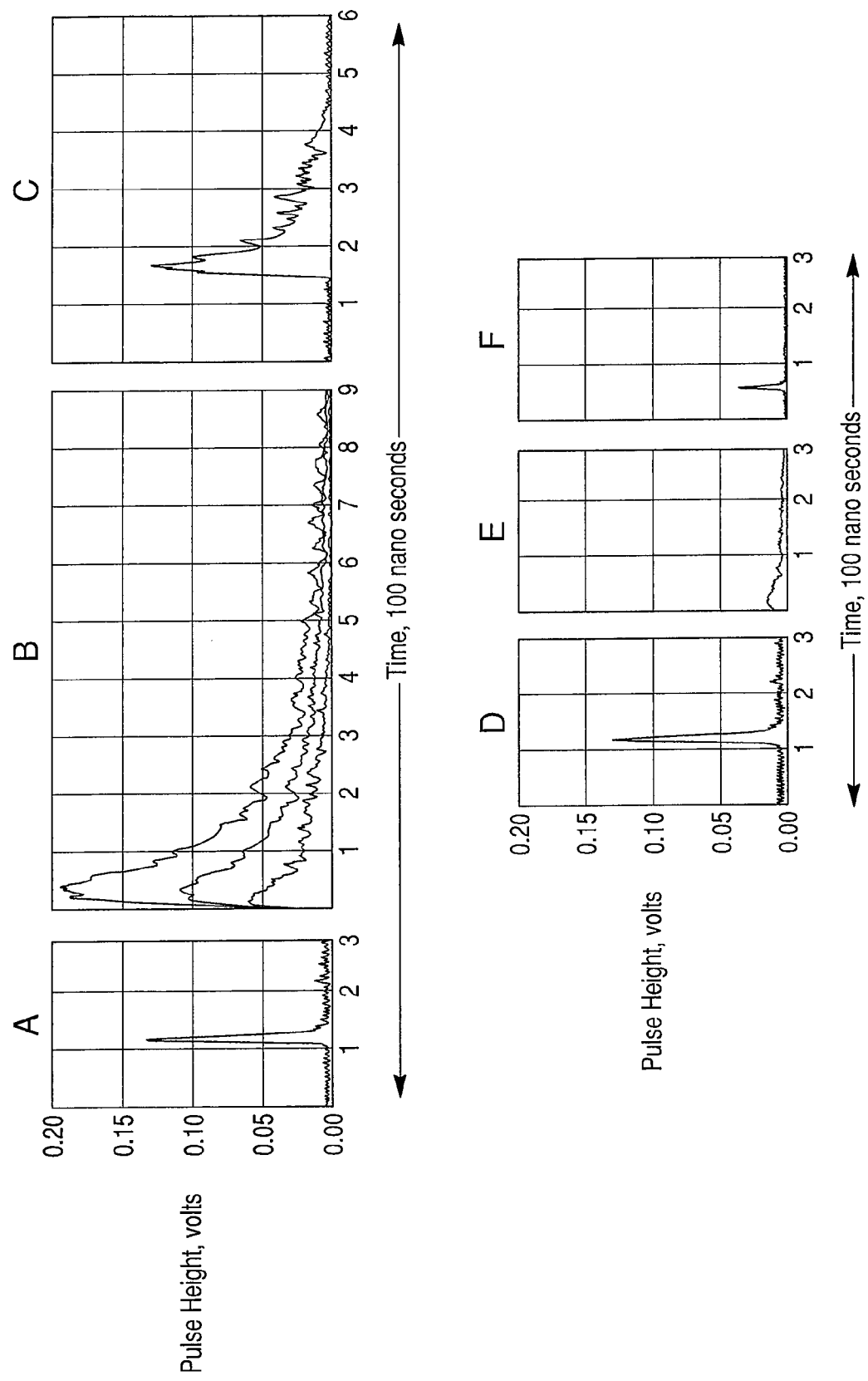
FIG. 3 illustrates typical pulse shapes measured in a mixed neutron and gamma radiation field.

The following series of graphs presents the signals produced by both gamma rays and neutrons in the composite LGB/PVT detector head 10. Due to the presence of two scintillators (the inorganic LGB crystals and the organic PVT), both of which respond to gamma rays, and three of the four major neutron capturing nuclei (Li, B, and Gd), the number and types of signals produced by this system in response to radiation is varied and complex. Fortunately, these signals can be digitized and are sufficiently different that it is possible to both identify them and classify them by type. As will be described below, when a neutron interaction depicted in FIG. 3A is followed within an appropriate time frame by capture in one of the three nuclei (FIGS. 3B and 3C), this combination of signals uniquely identifies a neutron and permits separation (or discrimination) of neutron events from gamma ray events.

Neutron Interactions

FIGS. 3A through 3C summarize the signals produced by the interaction of neutrons with the composite detector head. FIG. 3A represents the neutron interaction with the PVT scintillator and FIGS. 3B and 3C represent the signals produced by neutron capture in the LGB scintillator. In FIGS. 3A to 3F, each horizontal division is 100 nanoseconds.

FIG. 3A shows a pulse representing the sum of all neutron, proton (n,p) collisions of a single neutron in the PVT scintillating plastic. These pulses have a width in the range of 50 nanoseconds (ns) and variable pulse height ($N_0$) and area (A).

FIG. 3B shows pulses with a shape characteristic of Ce emission from thermal neutron capture in $^6$Li, $^{10}$B, and $^{157}$Gd. The alpha emissions from $^6$Li and $^{10}$B capture and the gamma emission from capture in $^{157}$Gd are presented by this figure. The pulses from capture in these three elements vary from the lowest energy $^{10}$B to the highest energy $^{157}$Gd resulting in different areas (A) and pulse lengths (PW10 or pulse width at 10% of maximum height) of hundreds of ns.

FIG. 3C shows pulses produced by neutron capture in $^{157}$Gd in the LGB scintillator, that emits one or more gamma rays which leave the crystal and interact with the PVT. Some of the capture energy is transmitted to the Ce in the LGB scintillator, resulting in the characteristic "tail" (long pulse length, or PW10), while the additional gamma interaction with the PVT causes a sharp initial pulse shape which combines with the Ce emission. Therefore, this pulse shape is a composite or hybrid of both LGB and PVT interactions of the neutron with the $^{157}$Gd.

Gamma Ray Interactions

FIG. 3D shows a pulse representing gamma ray interactions with the PVT plastic scintillator of variable pulse height ($N_0$) that very rapidly decays resulting in a very narrow pulse (PW10).

FIG. 3E shows a pulse representing gamma ray interactions with the LGB crystal that produce Ce emissions similar to those produced by neutron interaction, resulting in a pulse shape with a large pulse length (PW10) but with a clear distinction from the neutron interaction due to the extremely small pulse height ($N_0$). The cerium emission pulses produced by gamma ray interaction have a smaller area than even the $^{10}$B capture pulse and thus is easily separated (discriminated) from the neutron induced Ce emissions by the techniques described below.

FIG. 3F shows a pulse representing gamma ray interactions with the $^{157}$Gd where the energy is not transferred to the Ce. In this case, Gd scintillates independently of the LGB crystal, producing a pulse shape similar to the one in FIG. 3D. These pulses are of much smaller pulse height ($N_0$) and area (A) and easily identified and separated.

Pulse Shape Discrimination (PSD) Signal Analysis and Processing

The computer motherboard, along with the other components described above, perform pulse shape discrimination (PSD) signal analysis and processing.

Physics

The composite scintillator, which is comprised of scintillating LGB crystals uniformly embedded in scintillating PVT plastic, produces a pulse associated with the neutron collisions in the detector body (moderation) and another pulse at subsequent capture in the LGB single crystal.

Figure 4:
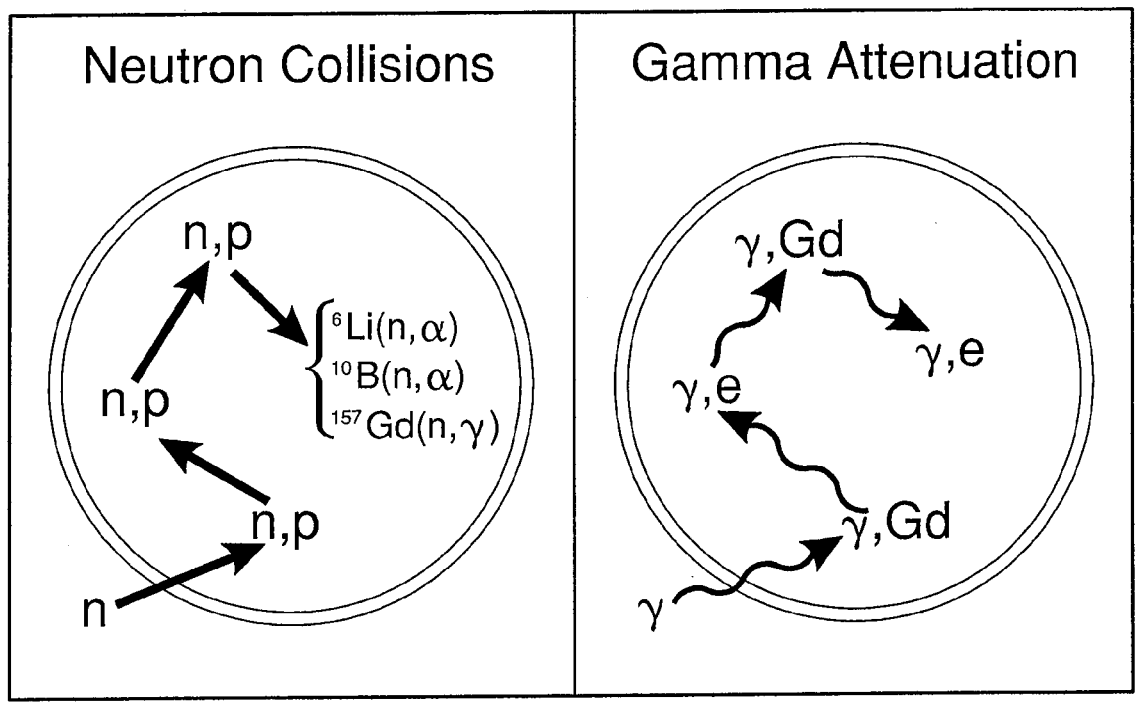
FIG. 4 illustrates how neutron-proton collisions in PVT moderate the neutron energy and how gammas also attenuate in PVT and LGB and emit pulses.

FIG. 4 is a schematic of a neutron moderating and capturing in the composite scintillator. The interaction of the fast neutrons with the plastic scintillator produces recoil protons that can be detected in the plastic by the emission of light. If the neutrons continue to slow down (moderate), in the detector volume, the probability increases that neutron capture will occur in the Li, B, or Gd. The multi-scattering events are seen to be rapid, and their light accumulates into a single short pulse of approximately 50 ns. In stark contrast, another potential event is the capture of the thermalized neutrons which results in a pulse width (PW10 in FIG. 3B) greater than 145 ns. The moderating and the capture of the neutron occur in a reasonably short time, 12 microseconds or less. If a moderating signal is followed by a capture signal within this prescribed time, then it is likely that a neutron has been identified. Even though the pulse shape of FIG. 3A (resulting from a neutron moderating) is similar to that of FIG. 3D (resulting from a gamma), by determining whether or not there is a subsequent capture (FIG. 3B or 3C), neutron events are distinguished from gamma events.

Use of the capture signal ensures the presence of a neutron. The area associated with the moderating pulse (paired with a capture pulse) is proportional to the energy of the impinging neutron when it loses its energy in a single collision. However, the inventors found, only 2% of the colliding neutrons become a thermalized neutron from a single collision. Thus, depending on the collision history (proton recoil, carbon, etc.) and resulting scintillations that comprise the moderating signal, a distribution of pulse areas can be measured for any given neutron energy. In other words, two neutrons having the same energy may produce moderation pulse areas that are different.

A modeling study, using MCNP5-X and the MCNP-4c/POLIMI codes, was conducted by the inventors to simulate the response of the LGB detector to a parallel stream of 8 different mono energy neutrons between 1-150 MeV and to predict the number of collisions before capture. MCNP-4c/POLIMI code tracks individual neutrons, calculates n-p collisions and the energy loss of each collision, until the neutron is captured.

The LGB detector head was modeled as a right circular cylinder 12.7 cm (5") in diameter and 10.16 cm (4") long of the PVT material. The LGB crystals were estimated to be spheres of 0.058 mm radius and distributed uniformly throughout the entire PVT cylinder. The radiation source was along the cylinder's axis as a parallel beam impinging on the entire front face of the detector body. To limit computational time, the entire space is confined to a spherical surface of 30 cm radius with the detector head located at the center of the sphere.

Figure 5:
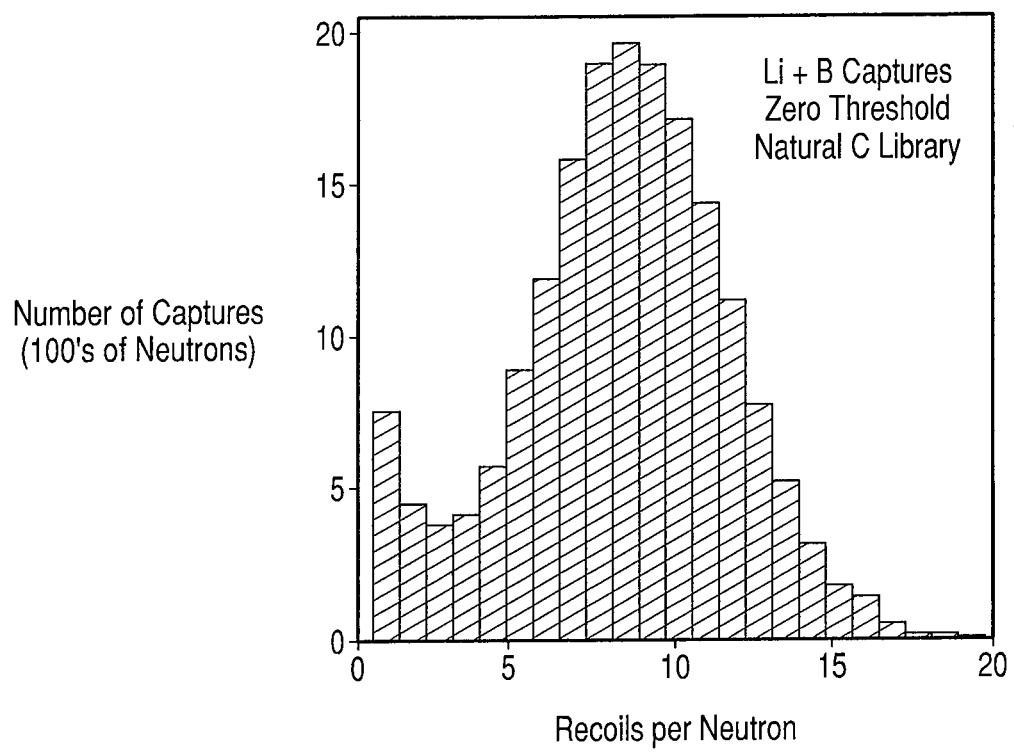
FIG. 5 illustrates a proton recoil distribution at 10 MeV.

FIG. 5 represents typical MCNP results showing the distribution of recoils (collisions) for a single incident neutron. The collision distribution is very similar for all the modeled neutron energies (from 1-150 MeV), and the average number of collisions before capture is approximately 10 collisions. The number of single collision events (where the loss of neutron energy was sufficient that capture was possible) is relatively small (~2%). These results support the experimental data demonstrating that different pulse areas are measured for a given impinging neutron energy and are dependent on neutron collision history.

It has been discovered by the inventors by extensive time-of-flight (TOF) testing with neutrons of known energy that the neutrons in each energy range will display a distribution of moderating pulse areas that is different than that for other energy ranges. For example, the distribution of pulse areas for 1000 neutrons in the 2-3 MeV range will be different than the distribution of pulse areas for 1000 neutrons in the 80-90 MeV range, and thus neutrons in different energy ranges will have different characteristic pulse area distributions.

Signal Processing, Signal Analysis, and Algorithms

The neutron spectrometer/dosimeter 100 output signals are processed through neutron identification and analysis software, Neutron.Analyst (N.A), that automates signal analysis and diagnostic capabilities to characterize, identify, classify and associate (pair) pulse signals. Once paired, the software also estimates the background and adjusts the total counts to obtain the measured neutron count. A number of template parameters that are used to describe and classify the signals are discussed below.

Figure 6:
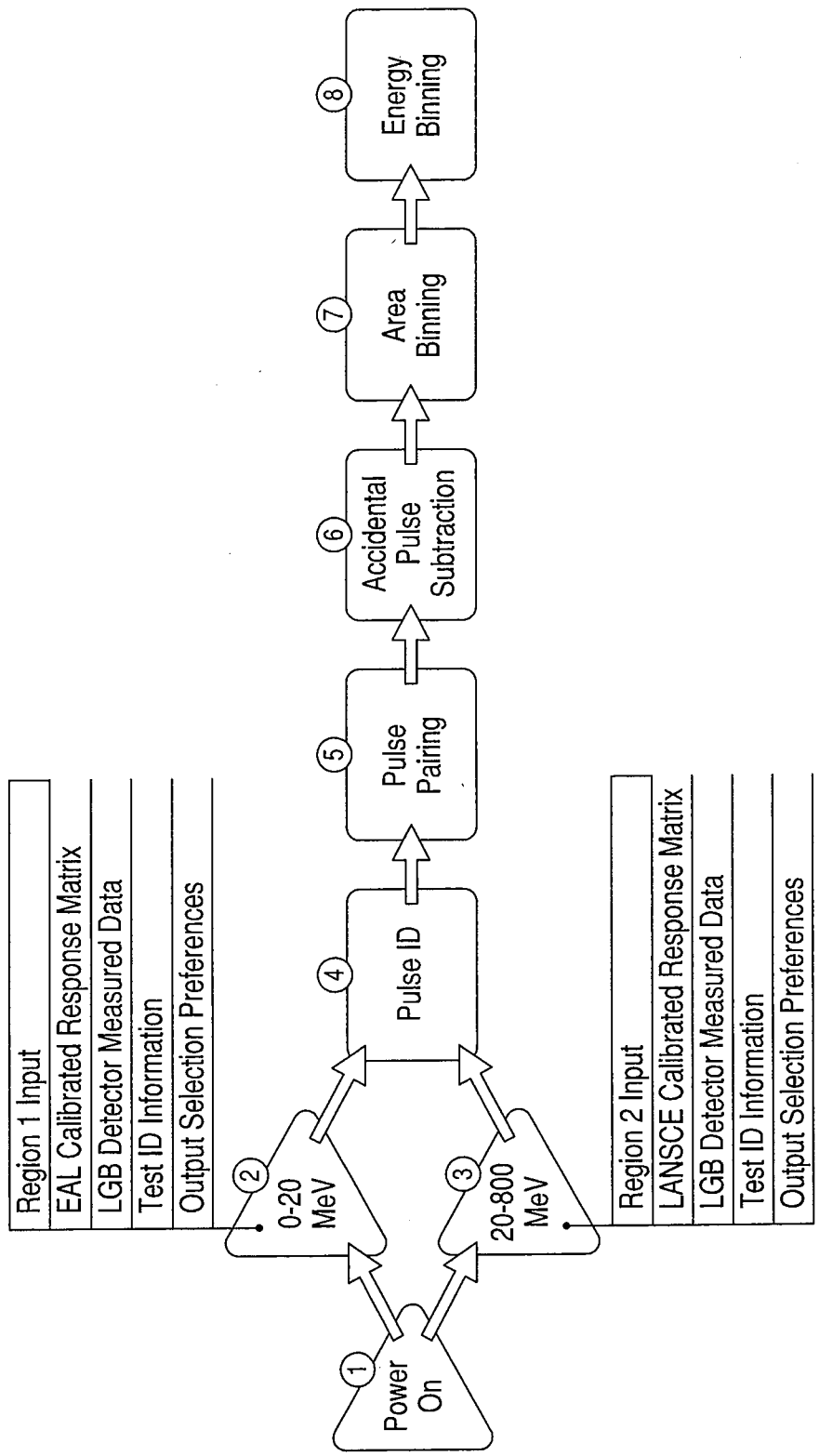
FIG. 6 illustrates a signal analysis flow chart that depicts major analysis steps contained in a neutron analysis software program of one embodiment of the invention.
Figure 19:
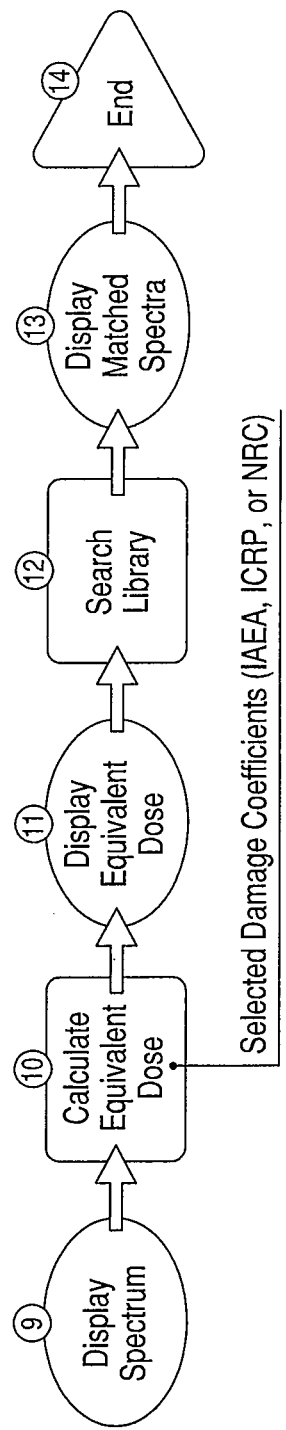
FIG. 19 is a flowchart for explaining how a neutron analysis program according to one embodiment of the invention generates displays of neutron spectrometer measured results.

FIG. 6 illustrates an overview of the processing up to neutron energy binning and FIG. 19 (to be discussed later) illustrates an overview of the processing from displaying the neutron spectra to the end. In FIG. 6, after power on, the system uses either an EAL calibrated response matrix (a calibrated response matrix is described in detail below) or a LANSCE calibrated response matrix depending on whether the 0-20 MeV region or the 20-800 MeV region is of interest. (Steps 2 and 3, FIG. 6). The software also receives measured detector data, test ID information, and output selection preferences as input.

Figure 7:
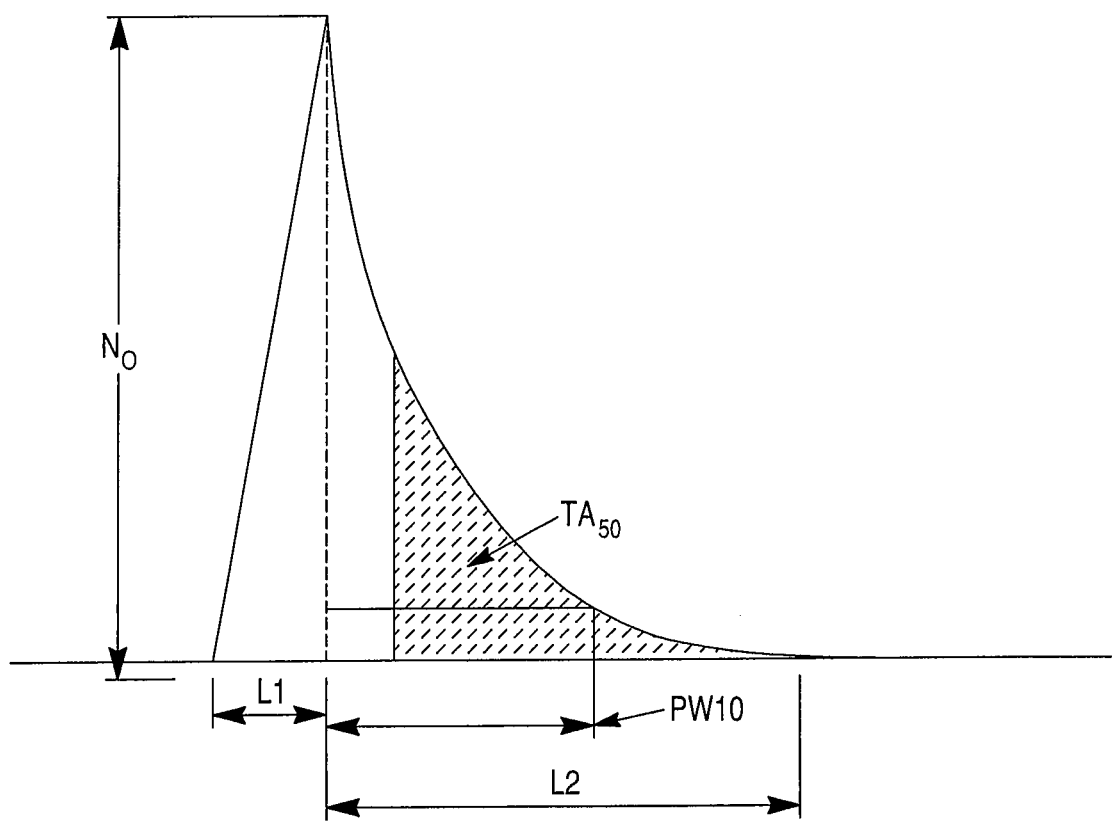
FIG. 7 is a schematic representation of pulse classification parameters.

Then, a recognition and classification process (step 4, Pulse ID, FIG. 6) begins by determining a rising edge above a threshold (above electrical noise), finds a pulse peak, and then the decay of the signal to near zero voltage. The N.A program then uses algorithms that correctly place each pulse in either a plastic (e.g., gamma and moderating, FIGS. 3D and 3A, respectively) pulse category or capture pulse category (FIGS. 3B and 3C). The programmed algorithms in this embodiment use three distinct pulse characteristics for pulse classification; namely, lambda ($\lambda$), total area, and pulse width (PW10) at various percentages of pulse height (10% in this case). FIG. 7 illustrates various pulse parameters. Several other characteristics, such as the length ratio L2/L1 and tail area at 50% ($TA_{50}$), may also be considered for various processes in the N.A program.

Lambda is the exponential decay constant of the pulse decreasing back edge, based on the formula:

$$N = N_0 \times e^{-\lambda t}$$

Where $N_0$ is the pulse height and t is the time difference between two adjacent data points on the digitized pulse decreasing edge. This equation is used to curve fit to the actual decreasing edge data points and lambda ($\lambda$) is the constant for the exponential curve that best fits the data. When lambda is very small, e.g. <0.012, the pulse has a long decay and "large tail" and thus the program classifies it as a capture pulse, while all other pulses having a lambda greater than 0.012 are classified as moderating (or gamma) pulses. The total area (A) is simply the integrated area under the shape of the pulse. The other parameters are defined in FIG. 7.

Figure 8:
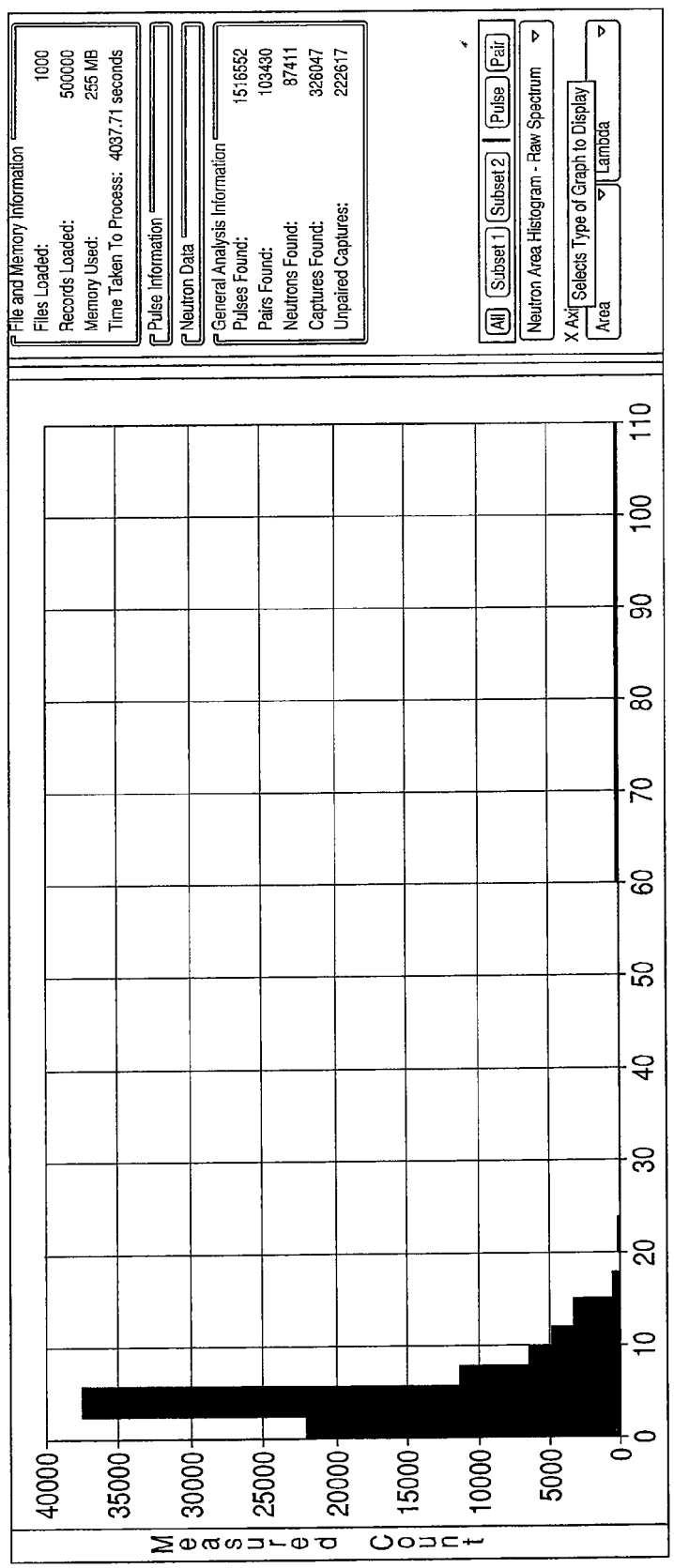
FIG. 8 illustrates a typical neutron analysis program analysis output in the form of a moderating pulse area histogram.

An example of a graphical user interface (GUI) of the N.A program is shown in FIG. 8. Various pulse characteristics can be displayed at the GUI; in the case of FIG. 8 the moderating pulse area distribution is shown. General analysis information on the right hand side of the GUI shows the total number of pulses found in the test data (1,516,552) of which 87,411 were determined to be neutrons.

Figure 9:
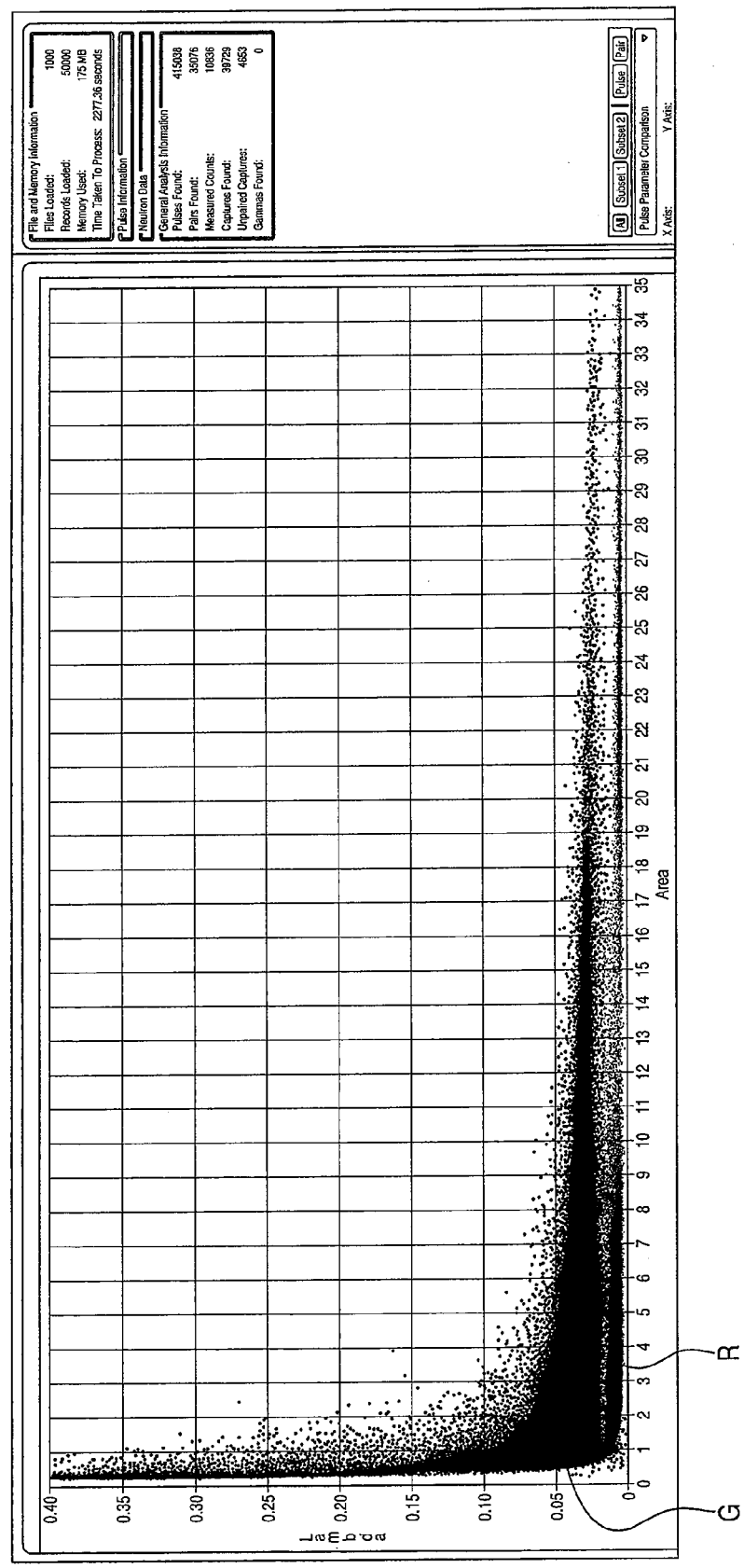
FIG. 9 illustrates a neutron analysis program plot of pulse characteristic parameters in the form of Lambda vs. area.

FIG. 9 shows lambda plotted against pulse area. This allows the user to observe a separation region and select the best value of lambda that separates neutron capture pulses in LGB (R region pulses) from moderating (or gamma) pulses (G region pulses). Other parameters such as PW10, late area, early area, and pulse height can also be displayed in the development mode of the N.A program.

Distinctive differences in pulse shape and/or pulse characteristics (such as lambda) are the key to correctly identify neutrons and classify them as moderating or capture pulses. These classified pulses are then paired (step 5, Pulse Pairing, in FIG. 6) by finding the nearest moderating pulse in front of a capture pulse. In the case of multiple capture pulses, the nearest unpaired moderating pulse is paired with any subsequent capture pulse. All paired pulses, that is a moderating pulse followed by a capture pulse, are further analyzed.

Additional parameters such as tail areas at 20-50% of $N_0$ (see FIG. 7—$TA_{50}$) as well as various area and parameter ratios may be mapped. These mappings can be three dimensional graphical plots of the various parameters to permit the user to identify additional features of distinction between moderating and gamma pulses.

In certain embodiments of the invention, various mappings or plots are generated, for example, $TA_{20}$ plotted against total pulse area and pulse height ($N_0$). By comparing such plots with the same parameters of a gamma test using Co-60, the inventors noticed that the very small pulses are a potential gamma elimination region.

Besides the above gamma elimination methods, additional background and/or accidental pairing removals lead to more accurate measured counts. Accidental pulse subtraction (step 6 in FIG. 6) involves plotting the time-to-capture of each pair, shown in FIG. 10.

Figure 10:
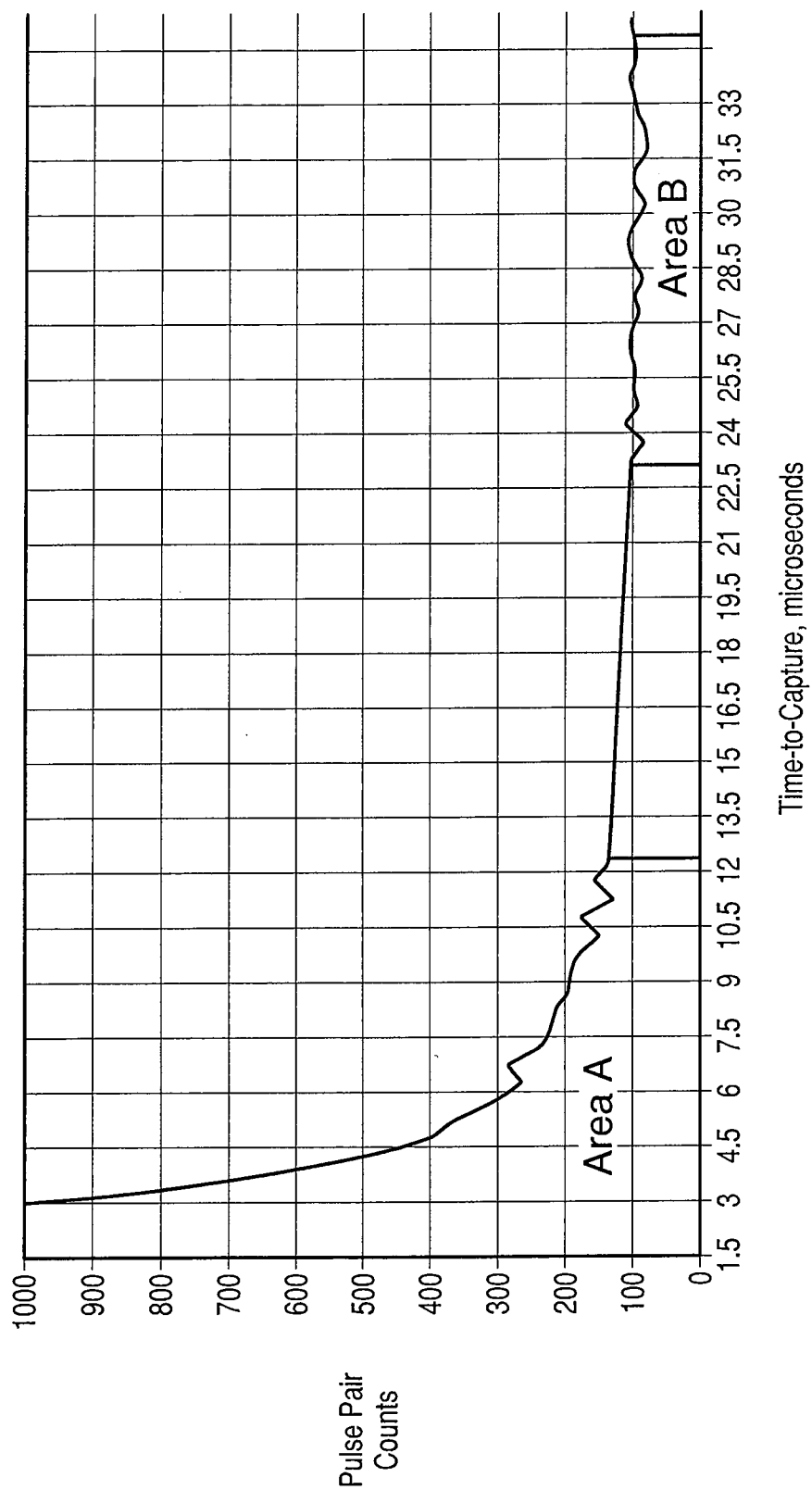
FIG. 10 illustrates how time-to-capture plots can be used to eliminate accidental pairs.

The underlying principle employed is that the time-to-capture must occur within 12 microseconds (μs). The time-to-capture (see FIG. 15) is measured from the first light pulse from the p,n interaction in the PVT (the rising edge of the moderating pulse) to the capture of the thermalized neutron (the rising edge of the capture pulse). The 12 μs has been validated with Monte Carlo modeling and by experimental data such as the example of a Cf-252 test plotted in FIG. 10. In FIG. 10, the portion of the data designated Area A contains all pairs whose times-to-capture are less than 12 μs. These are called possible neutrons. Then all the pairs in the portion of the data designated Area B are counted. These pairs represent random false-pairings due to gamma pulses or false moderating pulse identifications. Area B pairs could also be considered the background in a measurement. Area B must be of the same length; namely, 12 μs to calculate the correct background counts and subtract the background from the real signal. This is based on the fact that the same background in Area B also occurs for the first 12 μs, i.e. in Area A. The N.A algorithm subtracts the pair count in Area B from the pair count in Area A which results in the true neutron count remaining in Area A.

Neutron-Gamma Discrimination and Rejection

Figure 11:
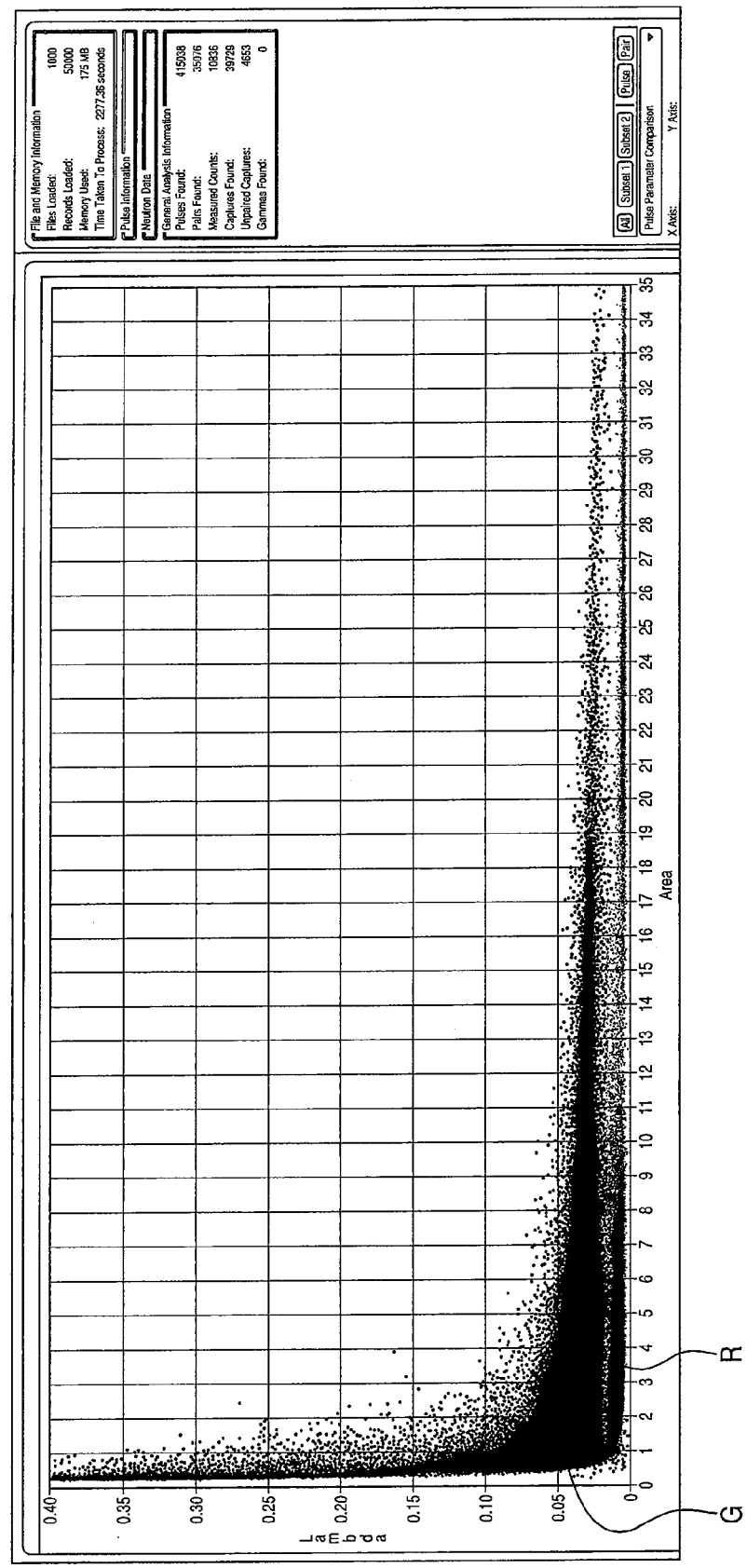
FIG. 11 illustrates a Lambda/area plot for a Cf-252 neutron/gamma field.
Figure 12:
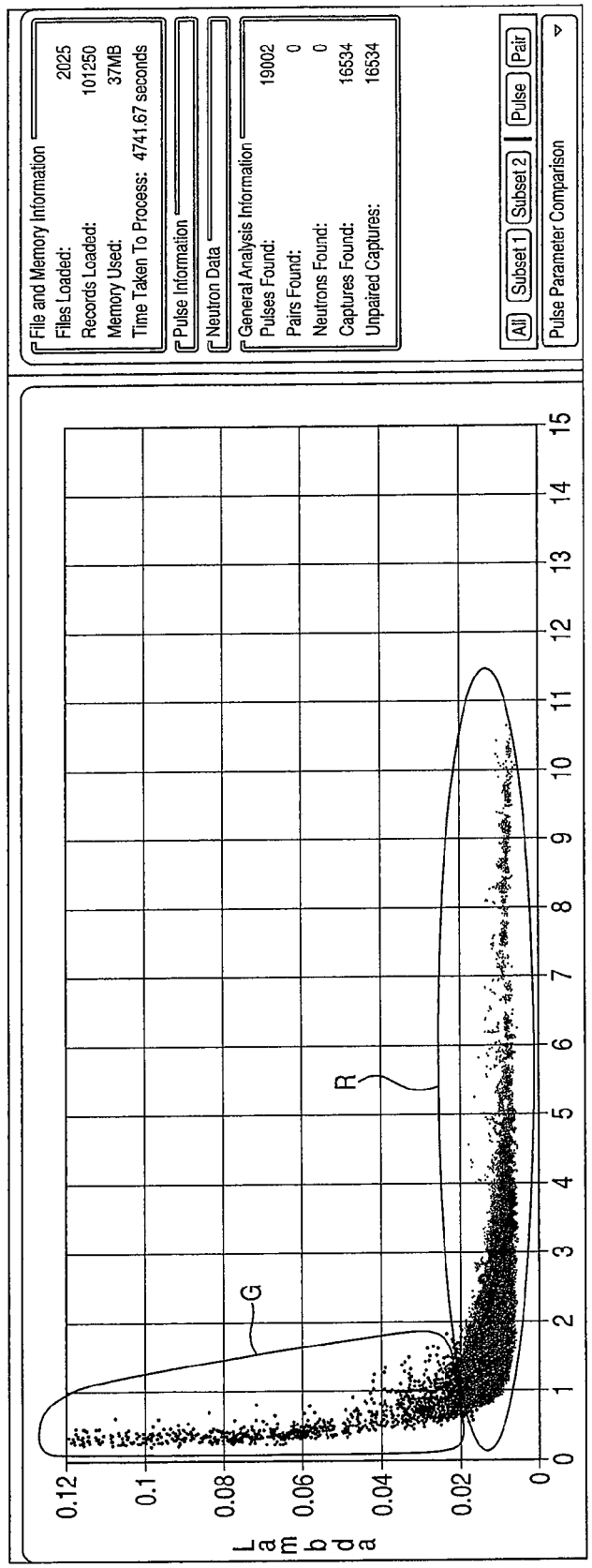
FIG. 12 illustrates a Lambda/area plot for a pure gamma field.

Tests were conducted by the inventors at Washington State University (WSU) and in-house, in a "pure" gamma field, to improve the neutron-gamma discrimination and rejection by the spectrometer algorithms. FIG. 11 shows the lambda distribution versus area (produced by the N.A program) for the WSU data using an LGB/PVT detector head of dimensions 2" (5.08 cm) diameter by 2" (5.08 cm) length. In one embodiment of the invention region R (capture pulses) is red and region G (moderating pulses) is green. This test was conducted using a Cf-252 source; i.e., a mixed neutron/gamma source. The inventors then tested a detector head with only PVT material to determine the regions of the FIG. 11 plot due to gamma interactions with the PVT. FIG. 12 shows the result of this test.

Figure 13:
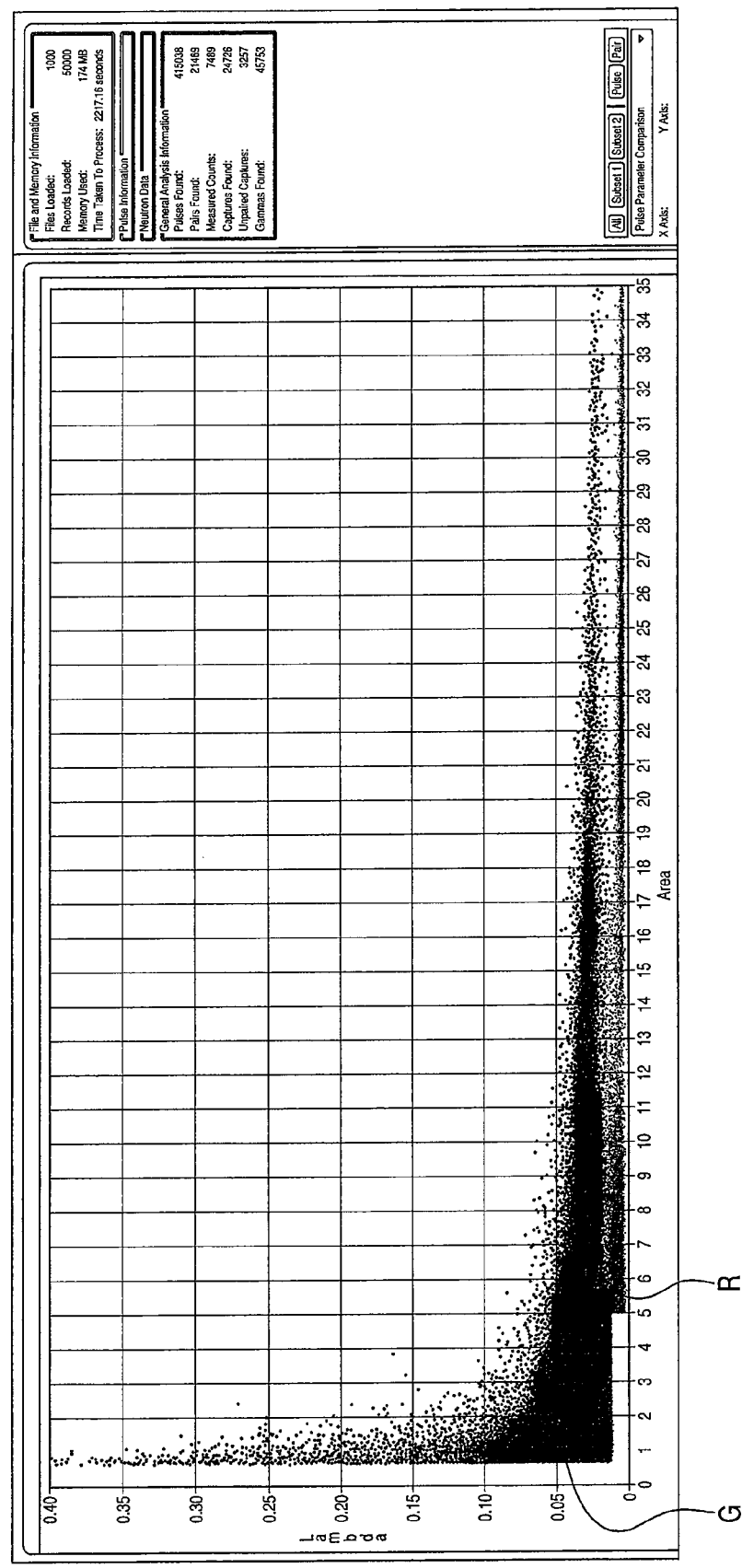
FIG. 13 illustrates a Lambda/area plot for a Cf-252 neutron/gamma field with gamma rejection.

FIG. 12 shows two distinct areas that can be positively identified as gammas in FIG. 11. One area G (green) is a vertical area from lambdas of 0.012 to 0.12 and areas of 0.0 to 1.5. The other area R is the horizontal area from lambdas of 0.0 to 0.012 and areas of 0.0 to 5.0. The pulses with these characteristics are rejected as gammas and the N.A program does not even consider them for pairing. FIG. 13 is a repeat of the neutron/gamma field test with these gamma pulses rejected or eliminated from the N.A analysis. Comparing the lambda versus area plot of FIG. 13 with FIG. 11 shows the effect of this gamma elimination. The measured neutrons without gamma rejection totaled 10836. After gamma rejection the measured neutron total was reduced to 7489, a 31% reduction; i.e., the rejected gammas were not mistaken as moderating pulses which leads to greater certainty of neutron detection.

Energy Calibration

Of the paired signals, the moderating pulse contains the information to estimate the energy of the impinging neutron. The neutron energy can be directly correlated with the areas of the moderating pulses by developing and using a calibrated response matrix (CRM) for the neutron detector and using an unfolding method as described below.

Pulse Area

Figure 14:
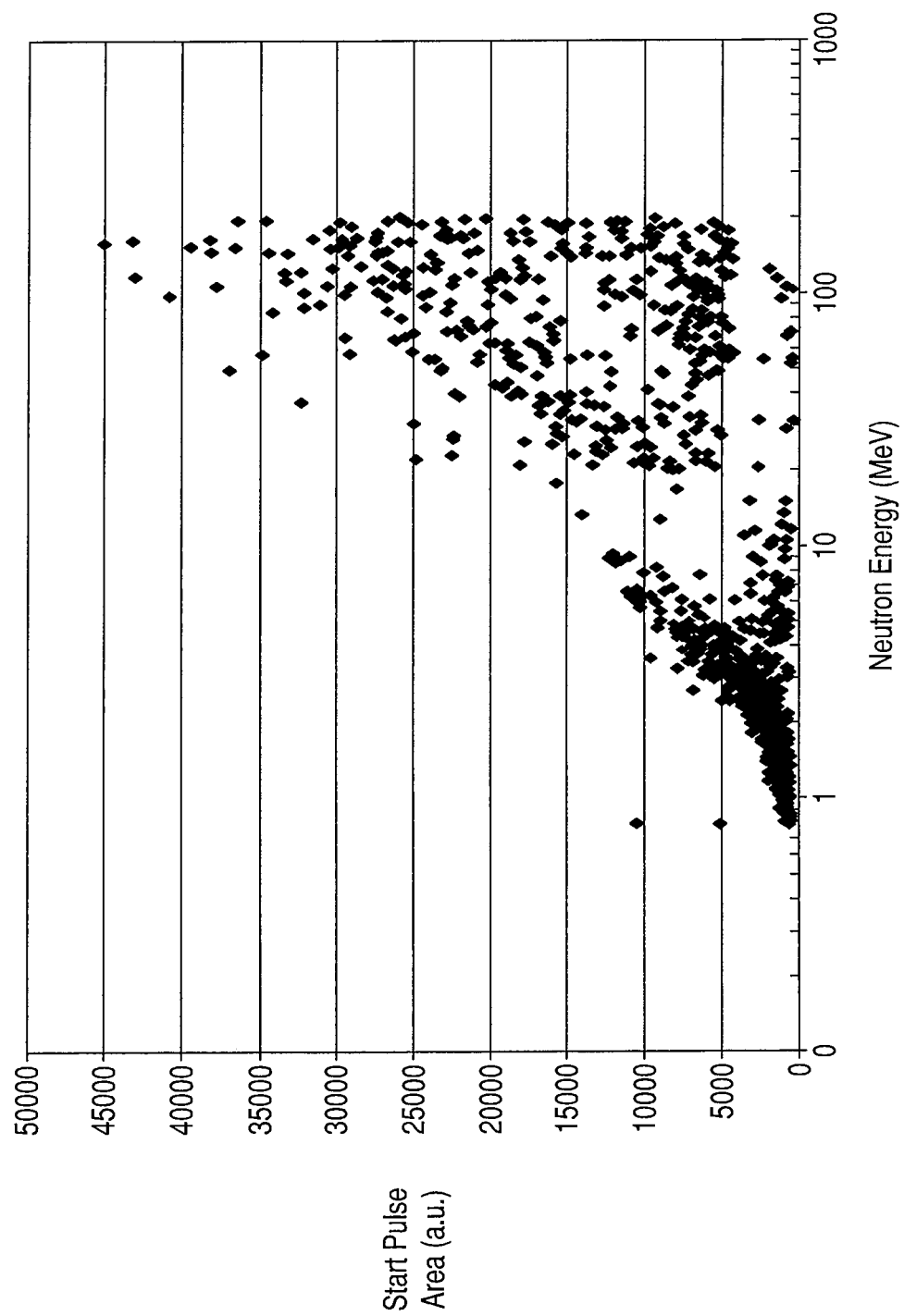
FIG. 14 illustrates start (moderating) pulse area plotted versus neutron energy.

FIG. 14 is a scatter plot of all the moderating pulses measured by the inventors at two test facilities ranging from 0.8 to 200 MeV. The energy of the neutrons in FIG. 14 was determined based on the time the neutron takes to travel from the accelerator beam target to the LGB detector in the time-of-flight (TOF) experiments the inventors conducted at the Los Alamos Neutron Science (LANSCE) facility and the Ohio University's Edwards Accelerator Lab (EAL). The area of the moderating (start) pulse was calculated and is plotted in relation to the TOF energy. This scatter plot shows an almost linear relation between the energy and pulse area of the top or highest 2% of the neutrons that lose all of their energy in a single collision. It is also clear from this plot that the other 98% of neutrons experiencing multiple collisions have smaller pulse areas than the top 2%. When the scatter plot is subdivided into narrow neutron energy ranges, or bins, the variation in moderating pulse area represents the basis for developing a CRM.

Time-of-Flight Data

Figure 15:
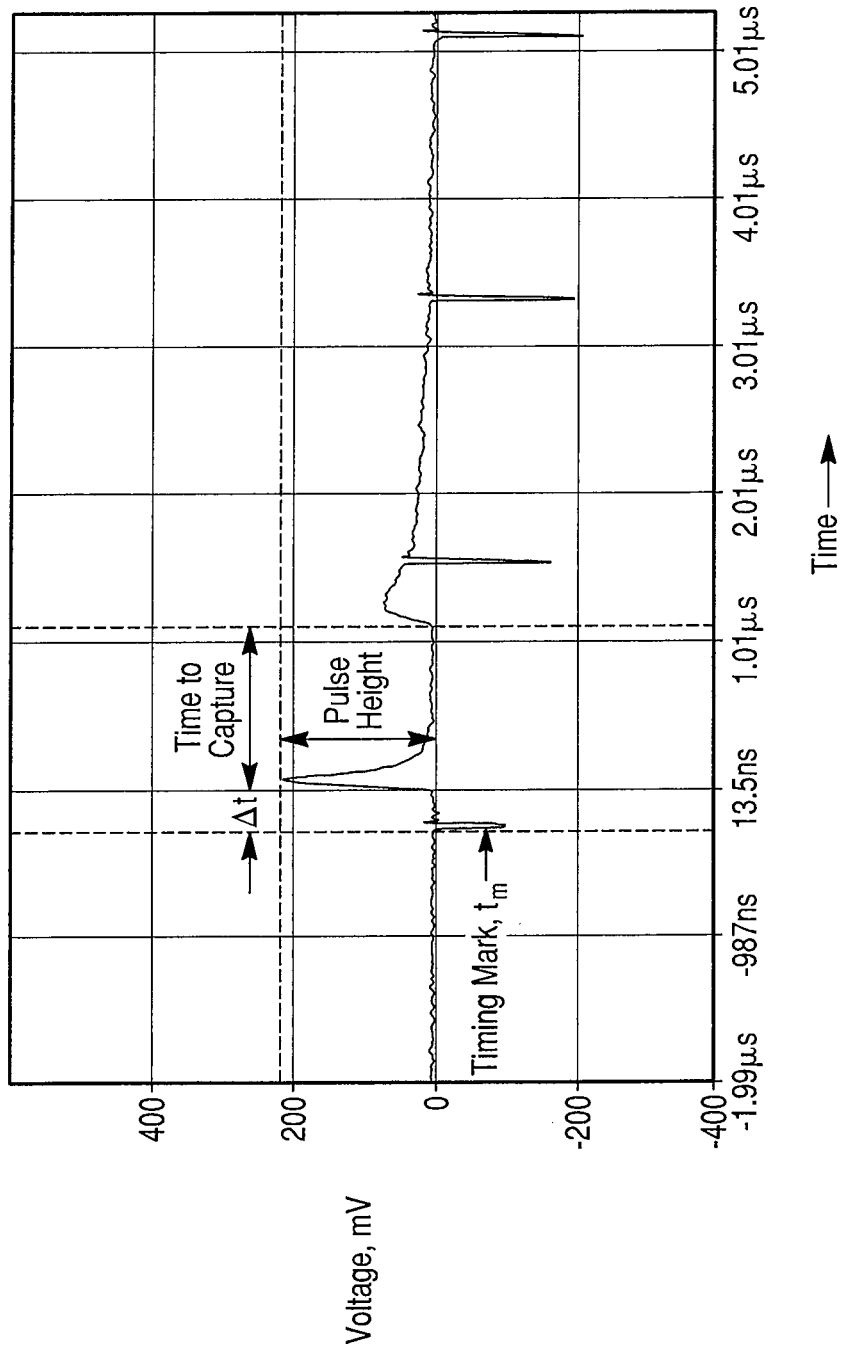
FIG. 15 illustrates TOF data acquisition of pulses with parametric definitions.

Time-of-Flight (TOF) data was acquired with a multi-channel digitizer at LANSCE and EAL test facilities to determine a relationship between the moderating pulse areas and TOF neutron energies. The neutron energy calculation is highly accurate based on the speed of light and the time measurement between the time the accelerator beam hits the target and the neutron enters the LGB detector. A sample data measurement is shown in FIG. 15. The TOF value is shown as Δt, or the time between the timing mark (when the beam hits the target) and the rise of the moderating pulse.

A statistically significant amount of TOF data were measured both in the 20-800 MeV range at LANSCE and in the 0.5-13 MeV energy range at EAL. This number of neutrons gave the assurance of adequate data to create the CRM and complete an accurate unfolded beam spectrum.

Calibrated Response Matrix

The inventors discovered that the time-of-flight experiments at LANSCE and EAL demonstrated a predictable correlation between the moderating pulse area and neutron energy. When the total number of neutrons over the entire energy range is divided into "energy groups," each energy group contains that fraction of pulse areas associated with the range of energies in the group. For example, the distribution of pulse areas for 1000 neutrons in the 2-3 MeV range will be different than the distribution of pulse areas for 1000 neutrons in the 80-90 MeV range, and thus neutrons in different energy ranges will have different characteristic pulse area distributions. A response matrix is constructed that contains all the energy groups beginning at the top with the lowest energy and ending with the highest energy group at the bottom. An example of such a matrix is shown in FIG. 16. In FIG. 16, each row designates a different energy range (for example an energy range around 1.38828 MeV) and each column is a different pulse area in volt·ns (see FIG. 3). For example, in the 1.38828 MeV energy bin, about 65% (0.645719) of the pulses have a pulse area around 1.656852 volt·ns. For each energy group, the pulse area fractions (along the horizontal) sums to 1.0.

Neutron Detection Efficiency

Figure 17:
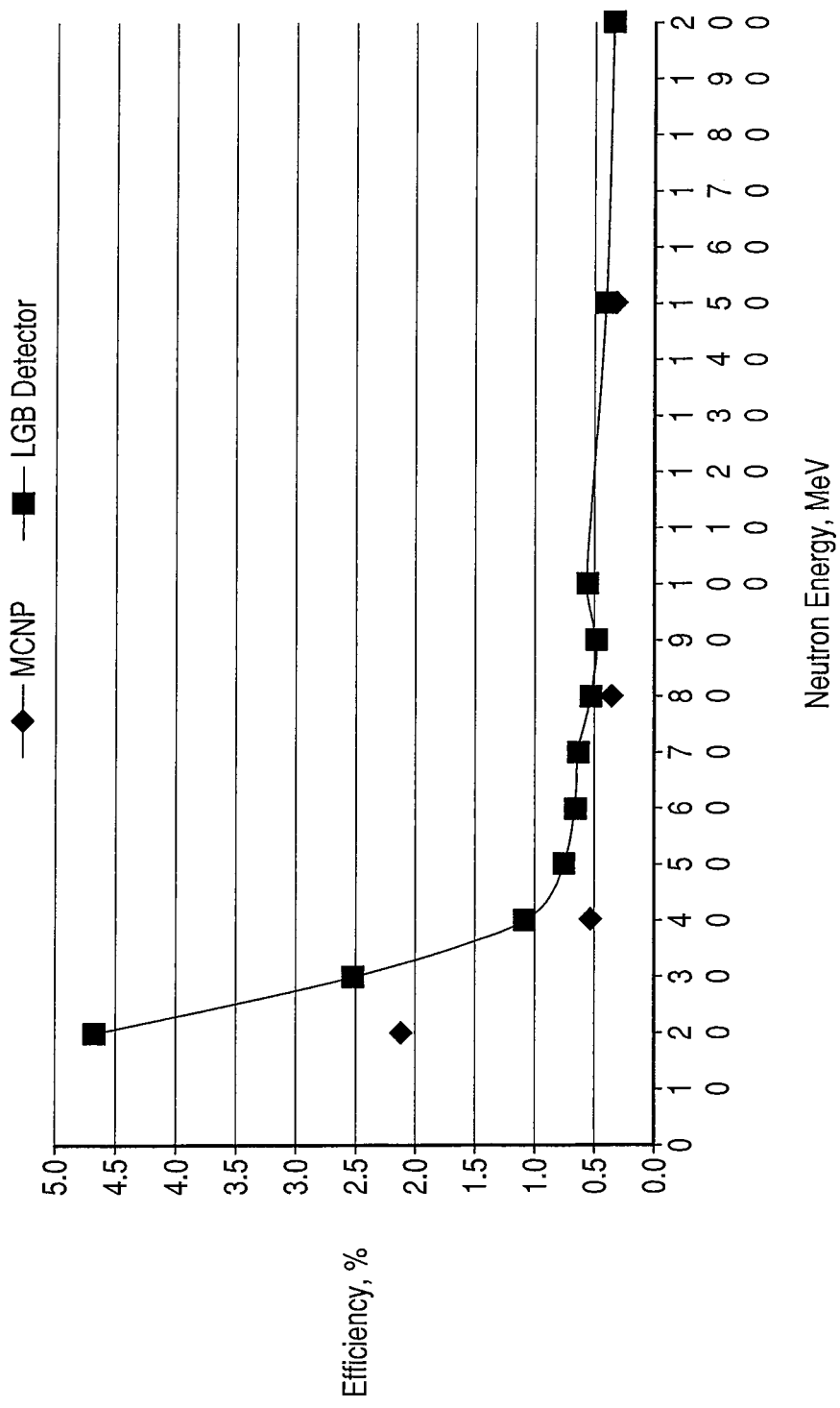
FIG. 17 illustrates neutron detection efficiencies of a detector of an embodiment of the invention in the high energy neutron field at the Los Alamos Neutron Science Facility (LANSCE).

The neutron detection efficiencies were determined as a function of energy to ensure their accuracy and relevance. The LGB neutron detection efficiency is defined as the ratio of the number of neutrons measured by the instrument divided by the number of neutrons incident to the detector's front face. The number of incident neutrons provided by the LANSCE beam was measured by calibration tests using U-238 foils at the exact test locations used for the LGB detector. FIG. 17 presents the calculated LGB neutron detection efficiencies between 20-200 MeV for the high energy LANSCE TOF test.

Also shown are the MCNP (computer model) predictions of the efficiencies (the single data points) and their comparison to the test measurements.

Figure 18:
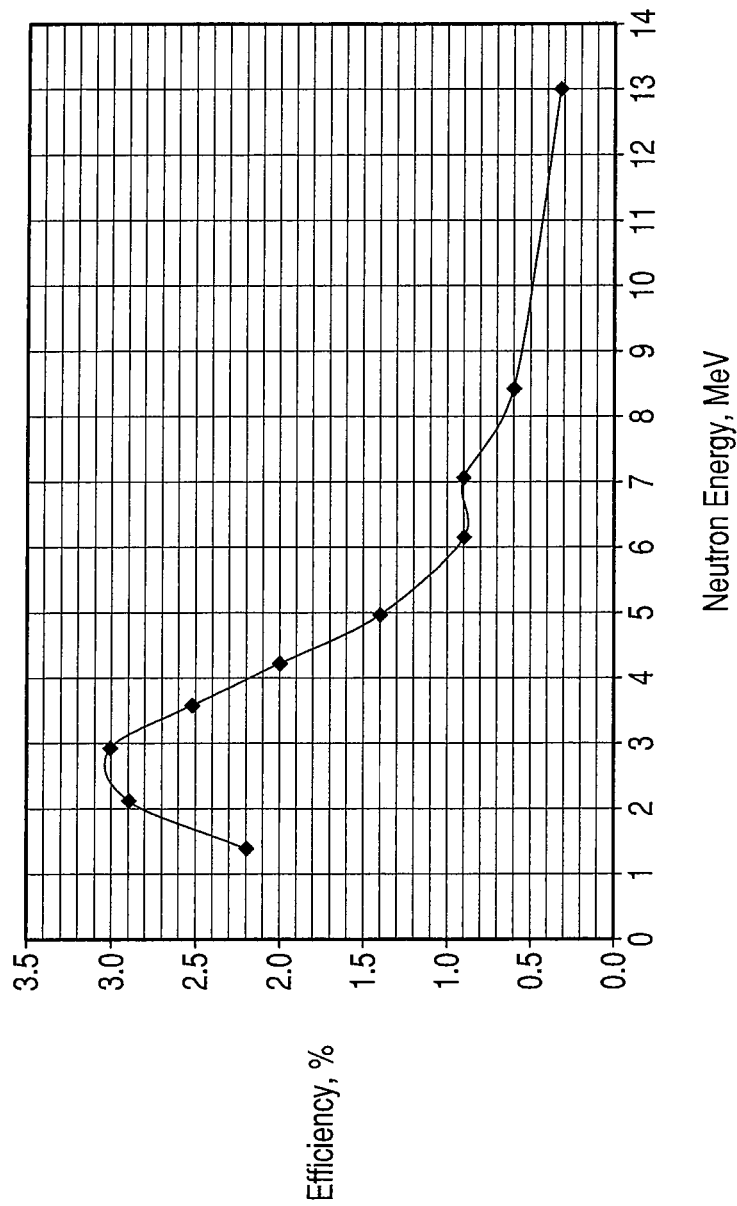
FIG. 18 illustrates neutron detection efficiencies of a detector of one embodiment of the invention in a test at Ohio University's Edwards Accelerator Lab (EAL).

FIG. 18 depicts the neutron detection efficiency for the 0.5-13 MeV energy regime as determined by the EAL experiments. The number of EAL beam neutrons incident to the detector was calculated by the EAL facility team based on the beam current hitting the target.

Unfolding Spectrum

The signal processing described above serves to eliminate "bad" or unnecessary data such that the unfolding described below is based on "good" data. To de-convolute the counts distributed at different moderating pulse areas and to produce neutron spectra, two unfolding algorithms, MAXED-FC33 and smoothed Sequential Least Squares (SLS), were used. However, the invention is not limited to use of such techniques and other unfolding or de-convolution techniques may be used. The MAXED-FC33 code is part of the UMG code (maximum entropy code UMG available from Oakridge National Laboratory, Reginatto, Marcel, "The Few-Channel, MXD_FC33, Unfolding Program Manual in the UMG 3.3 Package", DOE Release Date Mar. 1, 2004, whose entire contents are incorporated herein by reference for the algorithms, techniques, and processes related to unfolding). The MAXED-FC33 code is used to validate the actual SLS code used in the N.A program. The basic SLS code is available in publications (Y. Xu, T. J. Downar, M. Flaska, S. A. Pozzi, and V. Protopopescu, "Sequential Least Square Method for Neutron Spectrum Unfolding from Pulse-Height Distributions Measured with Liquid Scintillators", Joint International Topical Meeting on Mathematics & Computation and Supercomputing in Nuclear Applications (M&C+SNA 2007) Monterey, Calif., Apr. 15-19, 2007, whose entire contents are incorporated herein by reference for the algorithms, techniques, and processes related to unfolding). Both codes need the following inputs to calculate the unfolded spectrum: a calibrated response matrix (CRM), the neutron detector measured data, and a default spectrum that serves as a reference point for calculating the actual spectrum. The default spectra for both the LANSCE and EAL tests were supplied by the facility instruments based on standardized and well documented procedures. In order to compare the spectrum supplied by the facility instruments with the unfolded measured spectrum of the spectrometer 100, the default (or facility) spectrum was multiplied times the neutron detection efficiency of the LGB detector. The detailed calculations of both the MAXED-FC33 and SLS codes are presented later on below.

Dosage Output

As discussed above, FIG. 19 illustrates an overview of the processing from displaying the neutron spectra to the end. Once the measured neutron data are unfolded, the N.A program includes a few additional processes to display the resulting neutron spectra (step 9) on the GUI. The process steps are shown in FIG. 19 and include calculating equivalent dose (step 10) and matching the library which best fits the resulting measured spectrum (step 12) and displaying each of those two results (steps 11 and 13, respectively). The equivalent dose is based on one of the following standards; namely, the International Atomic Energy Agency (IAEA), the International Commission on Radiological Protection (ICRP), or the U.S. Nuclear Regulatory Commission (NRC) damage coefficients. The desired damage coefficient values can be selected by the user depending on which regulatory region the instrument is being used in.

Validation

The validation testing described below was conducted on the spectrometer/dosimeter 100 to prove acceptable performance.

Validation of Spectrometer 100 at LANSCE High Energy Neutron Beam

The Weapons Neutron Research Facility (WNR, LANSCE) provides neutron beams with energies ranging from about 0.1 MeV to more than 800 MeV from an un-moderated tungsten spallation source using the 800 MeV proton beam from the LANSCE linear accelerator. For the validation study energies above 17 MeV were needed; therefore, the 4FP 15 L (90 meter) beam line was used. Once the neutrons are produced they are further filtered with five centimeters (2") of lead and 20 centimeters (7.9") of moderating polyethylene ($CH_2$) with the beam size reduced progressively to a final aperture diameter of 8 mm in the exposure room.

Figure 20:
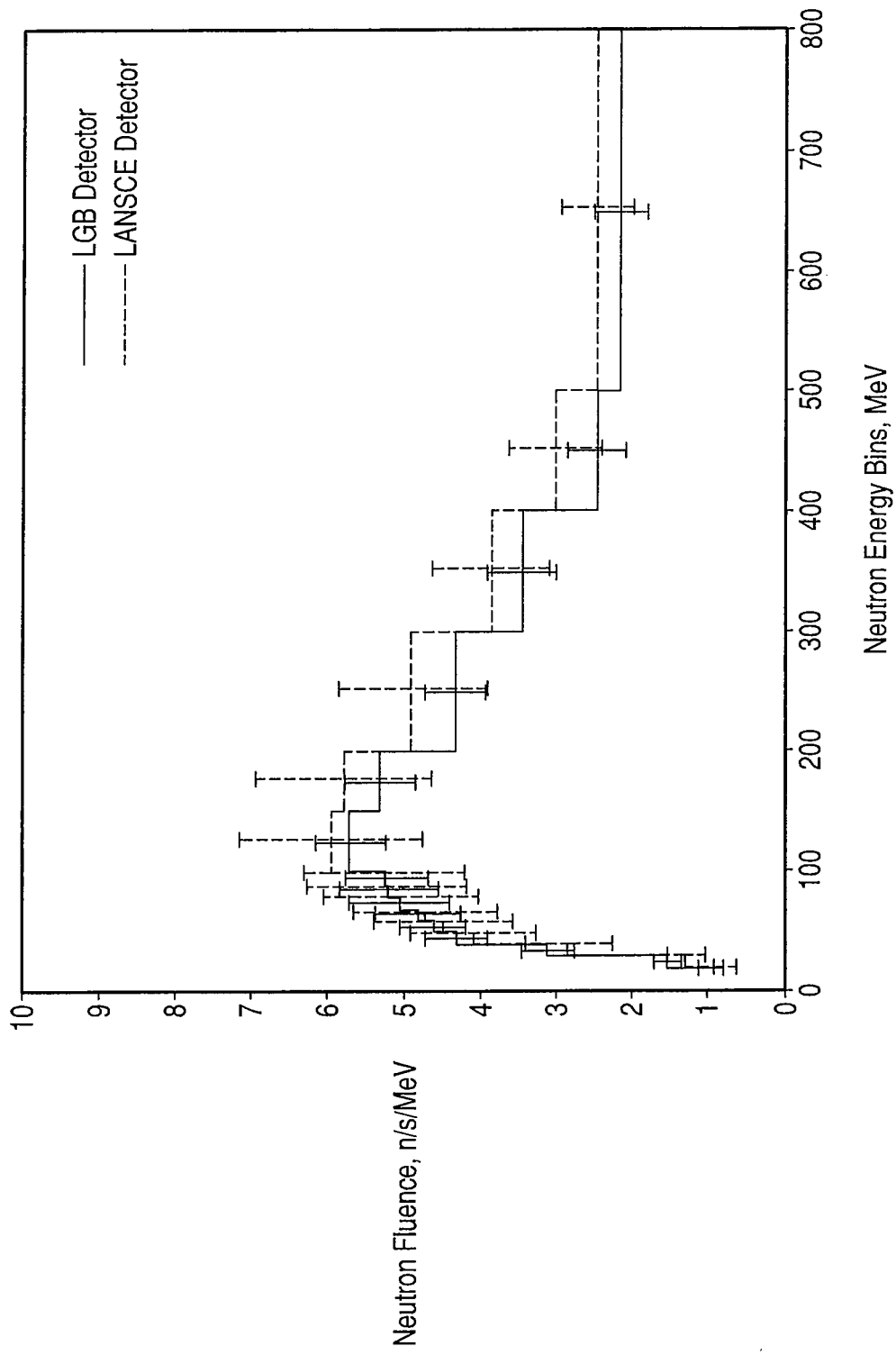
FIG. 20 is a spectrum comparison at 20-800 MeV of LANSCE detector data and detector data of an embodiment of the invention.

Using the UMG-MAXED-FC33 and SLS unfolding programs on the neutron measurements of spectrometer/dosimeter 100 yielded unfolded count rates for each of 15 energy bins. Dividing the count rate by efficiency at a specific energy results in the neutron fluence in that energy range. A comparison of the spectra produced by the LANSCE U-238 and the LGB methods of this embodiment is depicted in FIG. 20. Assigning the LANSCE neutron fluence into energy ranges similar to the calibrated response matrix allows for a direct comparison. The results appear to be in good agreement for the energies between 20 and 800 MeV. Specifically, examining the neutron spectra at the lower energies, between 20 and 200 MeV, close agreement with the neutron population as predicted from LANSCE's U-238 detection method is exhibited (see FIG. 21).

Figure 21:
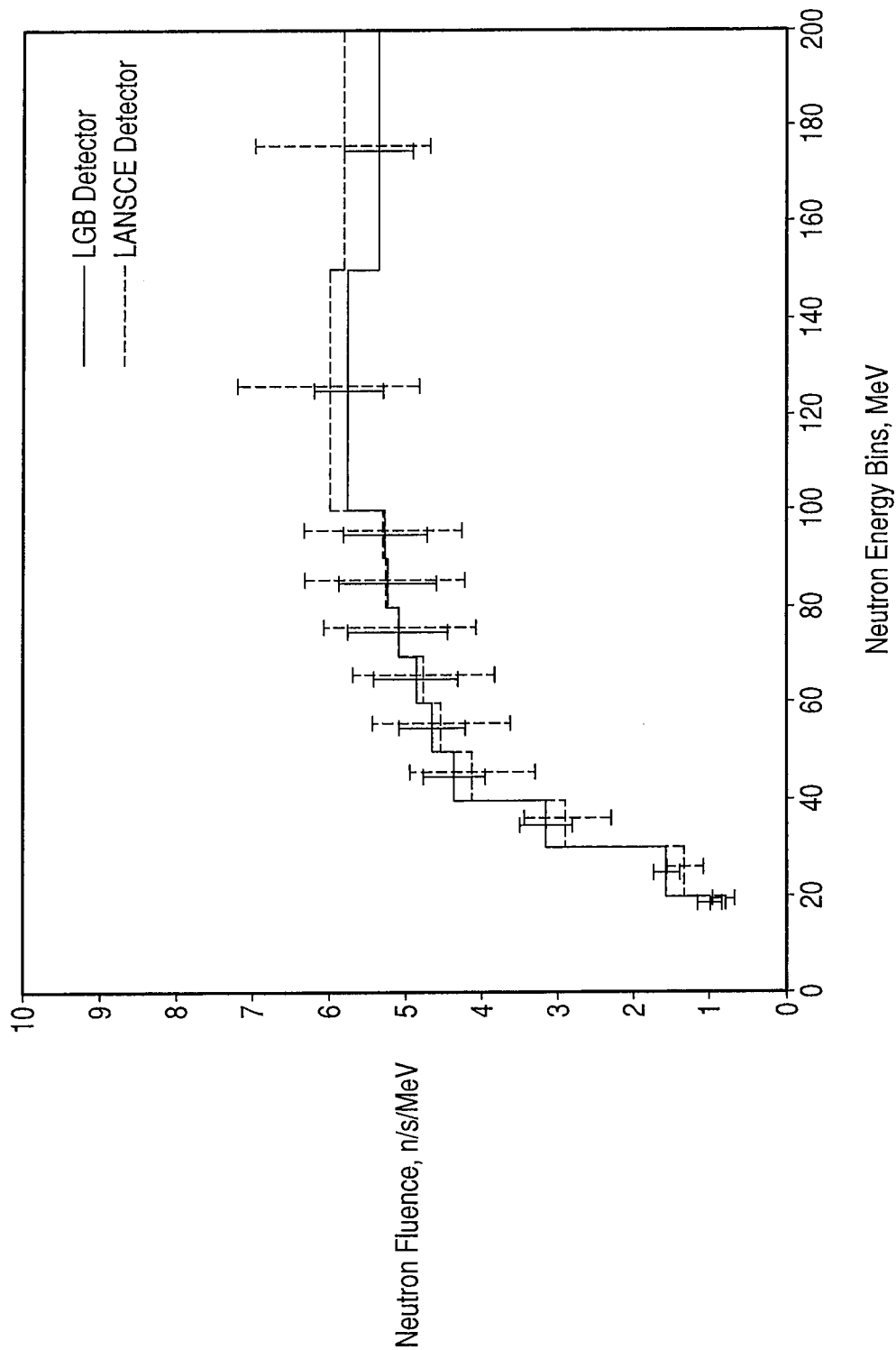
FIG. 21 is a spectrum comparison at 20-200 MeV of LANSCE detector data and detector data of an embodiment of the invention.

For completeness, the uncertainty of the neutron measurements, shown as error bars, is provided in FIGS. 20 and 21 as well. In general, the error ranged from approximately +/−8 percent variation, with the lowest/highest energies of 20 and 800 MeV indicating a +/−16 percent variation. The uncertainty of the invention is less than the uncertainty of the LANSCE detectors. Embodiments of the invention are also portable and much faster (existing systems sometimes take weeks to generate a spectrum). When evaluating the neutron fluence used in this testing, the spectral results from the U-238 foils reported a variation of approximately +/−20 percent. The uncertainty associated with the neutron spectrum generated from the spectrometer/dosimeter 100 was calculated by organizing an entire 38 hour data set obtained at the WNR-15L beam line into seven (7) distinct experimental data groups. The conditions of the beam were held constant during the beam's operation resulting in minimal variation in the neutron field for the 7 experimental groups. Evaluating the detection results in this manner allowed the mean neutron fluence and standard deviation to be calculated for each energy group.

Validation of Spectrometer 100 at EAL Fast Neutron Beam

The EAL located at Ohio University (Athens, Ohio) has an active tandem Van de Graff accelerator capable of generating a 6 MeV deuteron beam. When the 6 MeV beam strikes an Al-27 target, a spectrum of neutron energies between 1-12 MeV is emitted. The neutrons pass through a 10.61 cm diameter collimator into a 2.1 m diameter concrete tunnel. The spectrometer 100 was centered 7 m from the target downstream of the collimator.

Figure 22:
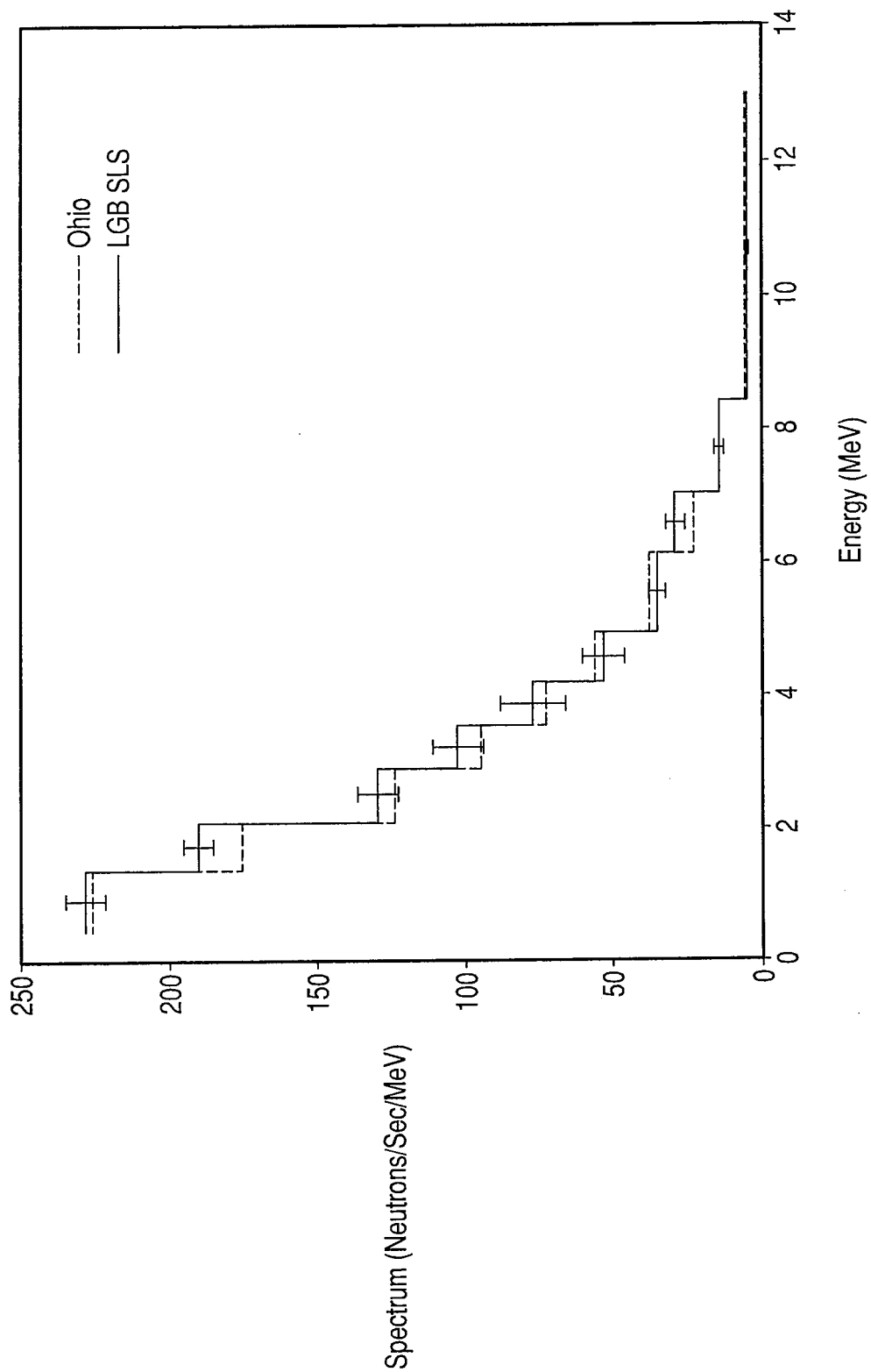
FIG. 22 is a spectrum comparison between EAL (Ohio) beam data and an embodiment of the invention using sequential least squares (SLS) unfolding.

The spectrometer-measured neutron spectrum was unfolded by using a spectral unfolding program and a CRM produced for this energy range. The neutron fluence for MeV neutron energies (presented in FIG. 22) was created by adjusting the unfolded count spectrum for energy efficiency. The EAL calibration measurements (supplied by EAL personnel and organized in similar energy bins for ease of assessment) are provided in FIG. 22 as well. The uncertainty of the measurement was estimated using Bayes rule as it progressively evaluated each energy group over the entire length of the experiment. The comparison shows good agreement between the two measurement techniques with an average deviation of +/−7.4 percent.

Figure 23:
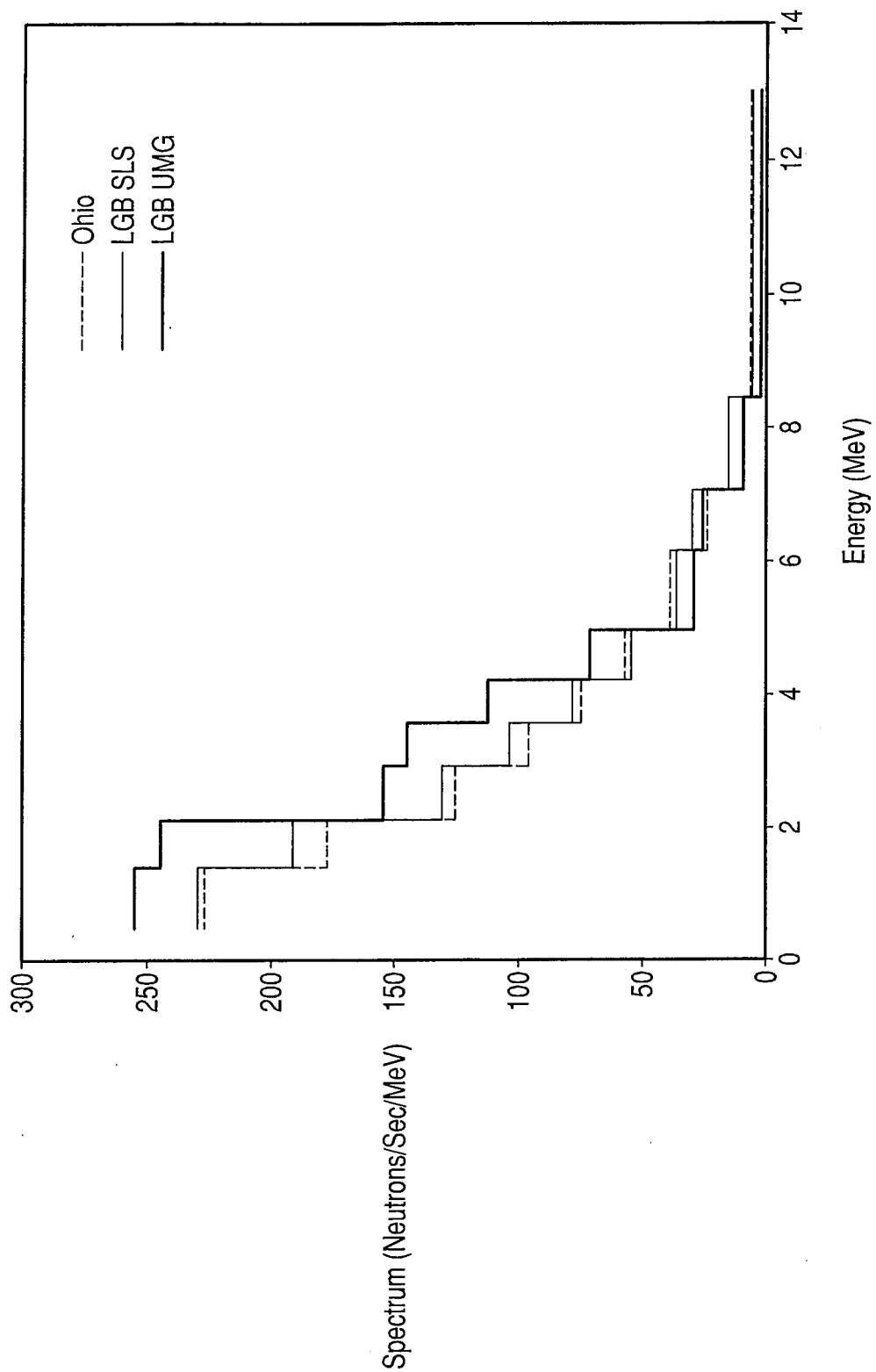
FIG. 23 illustrates spectrum comparisons using MAXED-FC33 unfolding code (UMG) of an embodiment of the invention, using SLS unfolding code of an embodiment of the invention and EAL (Ohio) beam spectra.

FIG. 23 depicts a comparison of the referee spectrum, using the MAXED-FC33 unfolding program, with the Ohio Beam and SLS unfolded spectra. As can be seen in this figure, the SLS unfolding program correlates well with the referee unfolding program and with the Ohio beam spectrum.

Figure 24:
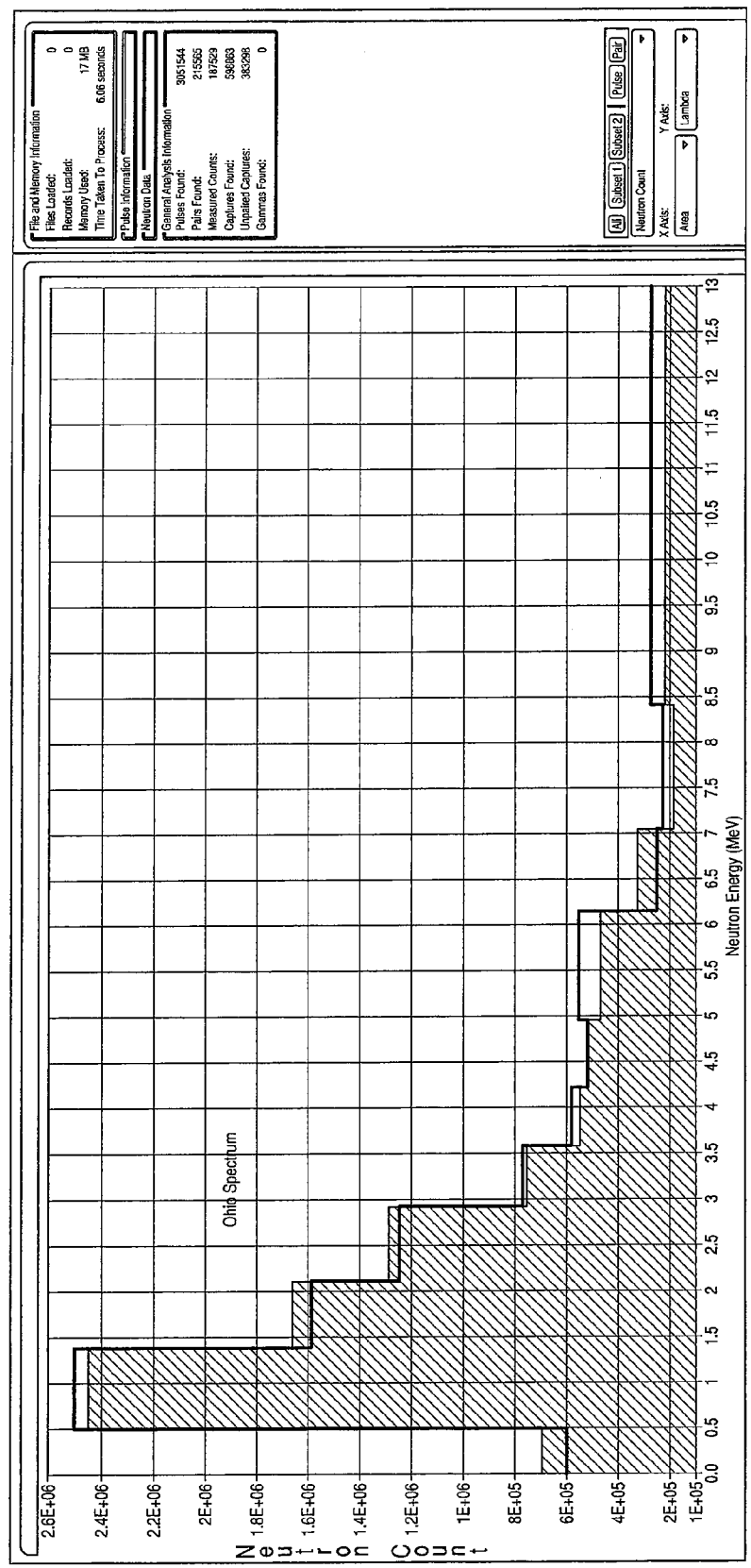
FIG. 24 illustrates an unfolded spectrum produced by an embodiment of the invention for an EAL beam compared to facility data.

A final result of the unfolding is shown in the N.A screen of FIG. 24. This shows good correlation between the unfolded measured spectrum and the EAL beam incident to the detector. To do this comparison, the measured number of neutrons in each energy bin needs to be divided by efficiency and then plotted in a histogram. This calculation increases the measured count to a level representing the radiation field hitting the front face of the LGB detector. This allows a direct comparison to the EAL beam, the bold line in FIG. 24. The data shows reasonable comparison between the spectrum measured by one embodiment of the invention and the facility measured spectrum.

Validation of Spectrometer 100 for Slow Neutrons at the Lowell-Massachusetts Slow Neutron Beam The 1 MW nuclear fission reactor at University of Massachusetts-Lowell was also used to measure radiation fields in the thermal and epi-thermal neutron energy regimes with an embodiment of the invention. The beam tube was optimized for neutron imaging, where a uniform field of thermal and epi-thermal neutrons is required, with a low number of neutrons having energies above the epi-cadmium cutoff. The conditioning of the neutron beam includes passing it through 4 feet of graphite, and a 0.1 inch aperture and a collimator with no mask filters at the beam exit.

This experiment provided known amounts and distributions of neutrons that possess thermal and epi-thermal energies. Because the thermal and epi-thermal neutron energies are well below 0.5 MeV, there are no associated moderating pulses that are recorded. The neutron population in the Lowell beam is 100 neutrons/cm$^2$-sec at the end of the radiography beam line. In addition, the number of neutrons above the epithermal is extremely small for this beam line. Therefore, for this group, only capture pulses are recognized. Measuring the calibrated beam with the instrument of this embodiment yielded an efficiency of 20 percent for the neutrons in this energy range. Results from MCNP-X calculations yielded an estimated efficiency for the detector head at 30 percent.

The slow neutron counts were estimated for an unknown neutron field by subtracting the portion of captures that are associated with neutrons greater than 0.5 MeV, which are not properly paired. Thus they are eliminated due to the inefficiency of the pairing algorithm from the total unpaired measured captures. The resulting counts divided by the efficiency for the slow neutron group yield the number of slow neutrons present. The equation below summarizes the process to determine the number of slow neutrons:

$$\text{Number of slow neutrons} = (up - pc(1 - Eff_{association}) / Eff_{association}) / Eff_{Slow\ neutron}$$

Where up represents unpaired captures, pc represents paired captures, and Eff represents the accuracy of the association algorithm or the efficiency of detecting slow neutrons.

Spectroscopic Dosimeter Performance of an Embodiment

In certain applications such as area monitoring, radioactive source identification, and health physics measurements, the spectroscopic/dosimeter of this embodiment can be run in the "User" mode. In this mode, the instrument streams data from the digitizer, analyzes each "packet" of 0.0296 seconds of data and then displays the spectrum, flux, fluence, and the total and rate of dose equivalent. A sample output is shown in FIG. 25.

Figure 25:
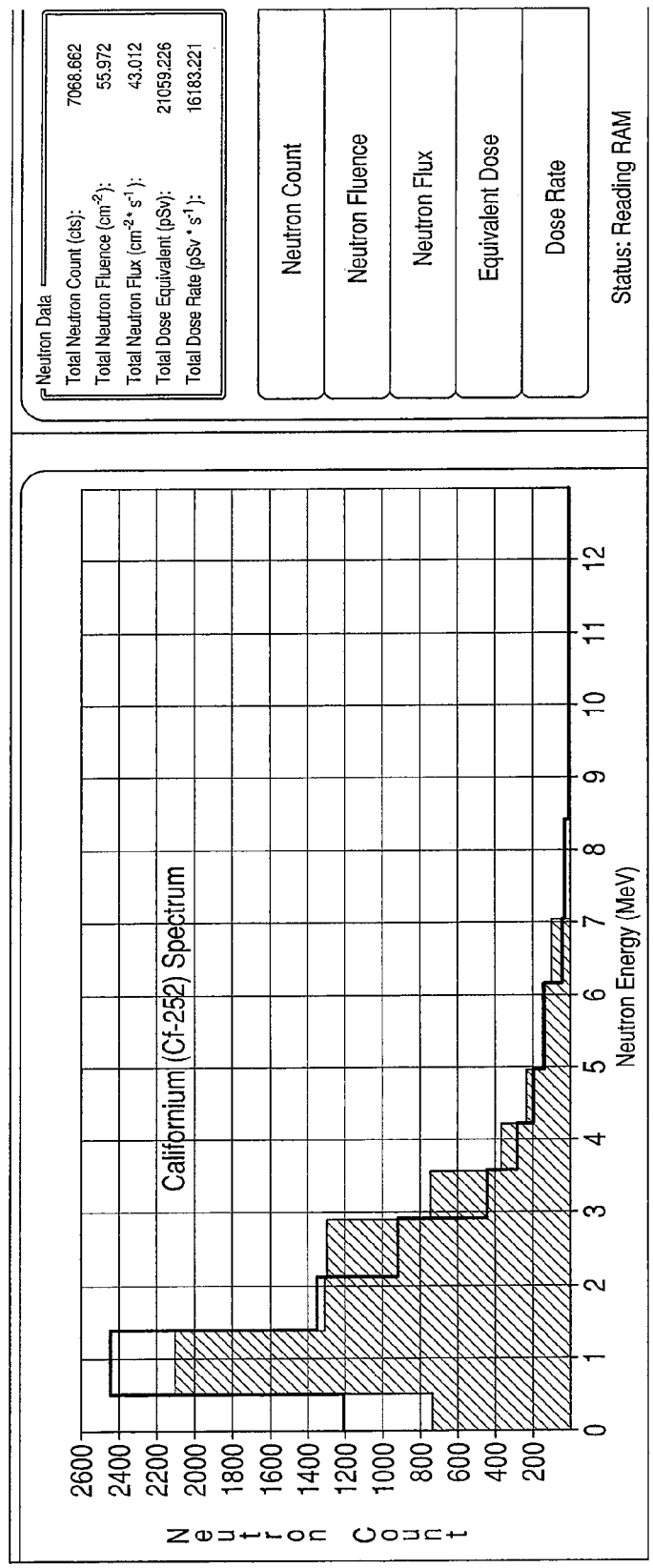
FIG. 25 illustrates a sample output showing a Cf-252 source spectrum and field strength (total neutron flux) including the total dose rate.

The example shown in FIG. 25 represents a test run in the inventors' lab using a 490 µCi radioactive source, Cf-252, which emulates the fission spectrum. The histogram is the measured neutrons divided by the TOF efficiencies measured in the Ohio EAL test. The damage coefficients used in this case are based on the ICRP74 tables. Multiplying the neutron count in each energy bin times the appropriate damage coefficient resulted in the total dose equivalent and total dose rate displayed in the Neutron Data field of FIG. 25.

Conclusions

The results above validate that the LGB/PVT composite neutron detector does produce an identifiable capture-gated response. The composite scintillator, which is comprised of LGB crystals uniformly embedded in a PVT plastic, produces a pulse associated with the neutron collisions (moderation) and, a second pulse of its subsequent capture. To distinguish the events, the detector uses advanced pulse shape discrimination algorithms that are capable of classifying scintillations from neutron and gamma collisions as well as neutron captures. Because the collected scintillations, comprising measured pulse area signals, will (as the inventors discovered) vary probabilistically for each neutron due to its energy, colliding constituents, and energy loss per collision, an unfolding algorithm such as a smoothed Sequential Least Squares (SLS) is employed to de-convolute the measured neutron spectrum. Using the SLS unfolding methods in an automated N.A software package leads to good correlation with known beam spectra and validates the performance of the LGB neutron spectrometer/dosimeter.

The results clearly show that the detector—when exposed to a variety of neutron sources—can reasonably measure/predict the energy distribution of the neutron field present. The accuracy of measurement/prediction is enhanced when the instrument is calibrated for a narrow energy range (e.g., thermal, 1-12 MeV). However, even when spanning from Low energy (<0.1 MeV) to 800 MeV, a good measurement/estimate of the energy spectrum is possible. The spectrum can then easily be converted to accurate dose equivalents.

Unfolding Program Details

MAXED-FC33 Unfolding Method

MAXED-FC33 utilizes a process that maximizes the relative entropy and avoids the instabilities of more straight forward methods. The required input data (files) include 1) the measured counts at increasing pulse area, 2) the calibrated response matrix (CRM, which relates pulse area distribution with neutron energy) and 3) the default (first guess) neutron spectrum.

Because the unfolding process can result in large changes in the prediction of neutron spectra for small variations in pulse-area distributions, care must be taken in obtaining a well-conditioned CRM. The default spectrum is used as the first guess, which allows for the converging of the measured data to obtain the unfolded neutron spectrum. For the best result, it is advantageous to incorporate any understanding of the measured field in the initial guess.

The conceptual basis of the maximum entropy algorithm used by MAXED is discussed in detail in various publications. Mathematically, the MAXED algorithm can be described in terms of a set of input parameters, a set of output parameters, and the equations relating these quantities. The algorithm requires the following input parameters:

$N_k$: measured counts
$\sigma_k$: estimate of the measurement error
$f_i^{DEF}$: default spectrum
$R_{ki}$: response matrix
$\Omega$: a parameter that fixes the $\chi^2$ of the solution Where $k=1, \ldots, m$ and $i=1, \ldots, n$, with $m<n$. The unfolding leads to a set of parameters $\{\lambda_k, \gamma\}$ that satisfies the following set of equations:

$$N_k + \varepsilon_k = \sum_i R_{ki} f_i$$

$$\sum_k \frac{\varepsilon_k^2}{\sigma_k^2} = \Omega$$

$$\sum_k \frac{N_k}{\sigma_k} - \sum_{k,i} \frac{R_{ki} f_i}{\sigma_k} = 0$$

$$f_i = f_i^{DEF} \exp\left\{-\sum_k \left(\lambda_k + \frac{Y}{\sigma_k}\right) R_{ki}\right\}$$

$$\varepsilon_k = \frac{\lambda_k \sigma_k^2}{2} \left[\frac{4\Omega}{\sum_j (\lambda_j \sigma_j)^2}\right]^{1/2}$$

Sequential Least Squares (SLS) Unfolding Method

Certain embodiments use SLS to produce a neutron energy spectrum in real time. As used herein "real time" means the spectrum is produced in less than one hour, preferably less than 30 minutes, more preferably less than 10 minutes. A modified SLS method is used that incorporates a Krylov subspace iteration method to solve the least squares equations. A known effect of SLS methods are that the results may oscillate from the correct neutron spectrum, therefore a 5-tap Quadratic digital filter (smoothing technique) was used to reduce the severity of these oscillations and produce spectra that are more meaningful. Similar to MAXED, the required input data (files) include 1) the measured counts at increasing pulse area, 2) the CRM, and 3) the default (first guess) neutron spectrum where all neutron values are greater than zero.

The following Least Squares (with weighting) equation is used to solve for the active and inactive sets to provide a nonnegative neutron counts at different energies.

$$\min f(x) = \frac{1}{2} \sum_{i=1}^n w_i \left(N_i - \sum_{j=1}^m R_{ij} x_j\right)^2$$

subject to $x_i = 0$ for $i \in S_A$ Subset of $S_B$

To insure nonnegative response the active set will have x values=0. The inactive set will have x values>0, and due to constraints on the solving mechanism there will be no x values less than zero because of the impossibility of having negative neutron counts.

Nomenclature for the following set of equations used in the SLS method is given below:

w=weighting function, typically set to the sqrt(N) or set to all values of one.
N=measured neutron counts distributed among Area bins
R=the response matrix
$S_B$=The complete Set $S_A$=The Active Set $S_B \backslash S_A$=The Inactive set
s, g, and $\alpha$=intermediate variables that are used in solving the algorithm In solving for a spectrum, a feasible initial guess is proposed, it does not need to be accurate, just a feasible starting point to get the algorithm started. In order to solve the previous equation and minimize the error in the Least Squares (with weighting) analysis, the following equations are used in a recursive manner to find the best solution with all non-negative numbers.

Solve for $s^{(k)}$ using the conjugate gradient method on normal equations (CGNE) method, from the following linear system $$\Sigma_{j-s_B \backslash s_A} \sqrt{w_i} R_{ij} s_j^{(k)} = \sqrt{w_i} N_i - \Sigma_{j \in s_B} \sqrt{W_i} R_{ij} x_j^{(k)}. \quad (1)$$

and then determine alpha and take a step forward by the following equations $$\alpha = \min\left(1, \begin{array}{c} \min \\ j \in S_B \backslash S_A \\ s_j < 0 \end{array} \frac{x_j^{(k)}}{-s_j^{(k)}}\right)$$

$$x_j^{(k+1)} = x_j^{(k)} + \alpha s_j^{(k)}$$

The j-value responsible for the given alpha is moved from the inactive to the active set; if alpha equals 1, then no values are moved to the active set.

The following equation is then solved $$g_q = \sum_{i=1}^m \sqrt{w_i} R_{iq} \left(\sqrt{w_i} N_i - \sum_{j \in S_B \backslash S_A} \sqrt{w_i} R_{ij} x_j^{(k)}\right)$$

for $$q \in S_A$$

for any positive value of $g_q$ move q into the inactive set immediately before calculating further values of $g_q$ If the active set changes, reset k=k+1 in equation (1) and proceed with the algorithm; otherwise, no change in the active set terminates the algorithm.

The inventors' current understanding of the theoretical physics of various phenomena is set forth above and this understanding may be refined or even changed by future study. The invention may be made and effectively used (based on the above description) even if some of the theory set forth above is later refined or changed. In other words, the ability to make and use the invention does not depend on the correctness of any theory.

The invention is not limited to the particular embodiments described above because many variations and modifications, within the scope and spirit of the invention, are possible. instead. Accordingly, the invention is defined with reference to the following claims.

What is claimed is:

1. A neutron spectrometer, comprising:
  an organic scintillator responsive to neutrons and gammas;
  an inorganic scintillator that captures neutrons;
  a processor which
  (1) receives signals representative of scintillations in the organic scintillator and in the inorganic scintillator and discriminates neutron signals from gamma signals;

(2) determines pulse areas for neutron moderating signals;

(3) determines measured counts at different pulse areas;

(4) receives a calibrated response matrix comprising the distribution of moderating pulse areas in neutron enemy bins detected from the organic scintillator as input; and (5) performs unfolding of the measured counts based on the calibrated response matrix, the received signals, and a default spectrum to produce a neutron energy spectrum.

2. A neutron spectrometer as set forth in claim 1, wherein the processor uses sequential least squares processing to produce the neutron energy spectrum.

3. A neutron spectrometer as set forth in claim 1, wherein the organic scintillator comprises poly-vinyl-toluene.

4. A neutron spectrometer as set forth in claim 1, wherein the inorganic scintillator comprises lithium gadolinium borate or lithium yttrium borate.

5. A neutron spectrometer as set forth in claim 1, wherein the unfolding uses ratios of pulse areas.

6. A neutron spectrometer as set forth in claim 1, wherein the inorganic scintillator is distributed in a matrix formed of the organic scintillator.

7. A neutron spectrometer as set forth in claim 1, wherein the processor discriminates neutron signals from gamma signals based at least on decay constant and pulse area.

8. A neutron spectrometer as set forth in claim 1, wherein the processor uses smoothed sequential least squares processing to produce the neutron energy spectrum in real time.

9. A neutron spectrometer as set forth in claim 1, wherein the processor performs integration to determine said pulse areas.

10. A neutron spectrometer as set forth in claim 1, wherein the processor curve fits decreasing edge data points to calculate a pulse decay constant.

11. A neutron spectrometer as set forth in claim 1, further comprising:

a display configured to display pulse parameters; and an input unit configured to receive from a user at least one pulse parameter setting for use by the processor to discriminate signals.

12. A neutron spectrometer as set forth in claim 1, wherein the processor identifies pulse pairs having a time-to-capture above a threshold as background.

13. A neutron spectrometer as set forth in claim 1, wherein the processor identifies pulses with a combination of decay constant and pulse area as gamma pulses.

14. A neutron spectrometer as set forth in claim 1, further comprising a photomultiplier tube.

15. A neutron spectrometer as set forth in claim 1, wherein the neutron spectrometer is configured to serve as a dosimeter.

16. A neutron spectrometer as set forth in claim 1, wherein the processor uses a smoothed sequential least squares unfolding algorithm to produce the neutron energy spectrum in real time.

17. A neutron spectrometer as set forth in claim 1, wherein the inorganic scintillator comprises $^6Li_6{}^{nat}Gd^{10}B_3O_9{:}Ce$ wherein $^6Li$, $^{10}B$, and $^{157}Gd$ neutron captures are identified by the processor by shape characteristic of Ce emission, and $^{157}Gd$ captures are processed by the processor through neutron analysis software.

18. A neutron spectrometer as set forth in claim 1, wherein the processor discriminates neutron signals from gamma signals based at least on decay constant and total area.

19. A neutron spectrometer as set forth in claim 1, wherein the inorganic scintillator is uniformly distributed in the organic scintillator.

20. A neutron spectrometer as set forth in claim 17, wherein some gammas interact with Gd and produce a scintillation, others deposit collision energy at a Gd site in LGB crystal and produce a Ce scintillation, which produces pulses that are identified and separated by the processor.

21. A neutron spectrometer as set forth in claim 1, wherein the processor curve fits decreasing edge data points to calculate an exponential decay constant lambda.

22. A neutron spectrometer as set forth in claim 1, wherein the processor identifies pulse pairs having an excessive time required for moderation and capture as background.

23. A neutron spectrometer as set forth in claim 1, wherein the processor receives signals representative of scintillations in the organic scintillator and in the inorganic scintillator, the signals including signals representative of interactions of neutrons with $^{157}Gd$.

24. A neutron spectrometer as set forth in claim 1, wherein the inorganic scintillator comprises lithium, gadolinium, boron, or any combination of these.

25. A neutron spectrometer as set forth in claim 1, wherein the inorganic scintillator comprises cerium or any other activator.

* * * * *